(12) United States Patent
Lee et al.

(10) Patent No.: US 9,904,409 B2
(45) Date of Patent: Feb. 27, 2018

(54) TOUCH INPUT PROCESSING METHOD THAT ADJUSTS TOUCH SENSITIVITY BASED ON THE STATE OF A TOUCH OBJECT AND ELECTRONIC DEVICE FOR SUPPORTING THE SAME

(71) Applicant: Samsung Electronics Co., Ltd., Gyeonggi-do (KR)

(72) Inventors: Sung Jun Lee, Gyeonggi-do (KR); Min Jung Kim, Gyeonggi-do (KR); Won Huh, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 15/095,413

(22) Filed: Apr. 11, 2016

(65) Prior Publication Data
US 2016/0306491 A1   Oct. 20, 2016

(30) Foreign Application Priority Data

Apr. 15, 2015 (KR) .................... 10-2015-0052965
May 11, 2015 (KR) .................... 10-2015-0065395

(51) Int. Cl.
*G06F 3/041* (2006.01)
*G06F 3/0488* (2013.01)
(Continued)

(52) U.S. Cl.
CPC ............ *G06F 3/0416* (2013.01); *G06F 3/02* (2013.01); *G06F 3/0346* (2013.01); *G06F 3/0412* (2013.01); *G06F 3/0418* (2013.01); *G06F 3/0482* (2013.01); *G06F 3/0488* (2013.01); *G06F 3/04817* (2013.01); *G06F 3/04842* (2013.01); *G06F 3/04845* (2013.01); *G06F 3/04847* (2013.01); *G06F 3/04883* (2013.01); *G06F 3/16* (2013.01); *G06K 9/00006* (2013.01); *G06F 2203/0338* (2013.01)

(58) Field of Classification Search
None
See application file for complete search history.

(56) References Cited

U.S. PATENT DOCUMENTS 7,099,496 B2    8/2006  Benkley, III
8,294,686 B2 *  10/2012 Townsend ............ G06F 3/0416
                                                  340/407.1
(Continued)

FOREIGN PATENT DOCUMENTS

EP    2 778 867 A2    9/2014

OTHER PUBLICATIONS

European Search Report dated Aug. 25, 2016.

*Primary Examiner* — Ilana Spar
*Assistant Examiner* — Kirk Hermann
(74) *Attorney, Agent, or Firm* — Cha & Reiter, LLC

(57) ABSTRACT

A method and electronic device are provided. The electronic device includes a first touch sensor and a processor. The processor implements the method, which includes detecting, via a first touch sensor of the electronic device, sensor information from a touch object, determining, via a processor of the electronic device, a state of the touch object based on analysis of the detected sensor information, and adjusting a touch sensitivity for the electronic device according to the determined state of the object.

20 Claims, 16 Drawing Sheets

(51) Int. Cl.
*G06F 3/0484* (2013.01)
*G06F 3/02* (2006.01)
*G06F 3/0346* (2013.01)
*G06F 3/0481* (2013.01)
*G06F 3/0482* (2013.01)
*G06F 3/16* (2006.01)
*G06K 9/00* (2006.01)

(56) References Cited

U.S. PATENT DOCUMENTS

| | | |
|---|---|---|
| 2003/0035570 A1 | 2/2003 | Benkley, III |
| 2010/0063818 A1* | 3/2010 | Mason .................. G06F 3/0482 704/251 |
| 2012/0268411 A1* | 10/2012 | Chen ....................... G06F 3/044 345/174 |
| 2014/0111430 A1* | 4/2014 | Shima ..................... G06F 3/044 345/157 |
| 2014/0189563 A1 | 7/2014 | Kim |
| 2014/0198064 A1 | 7/2014 | Kim et al. |
| 2014/0267085 A1* | 9/2014 | Li .......................... G06F 3/041 345/173 |
| 2014/0267108 A1 | 9/2014 | Chung et al. |
| 2014/0340342 A1* | 11/2014 | Higashibeppu ....... G06F 3/0416 345/173 |
| 2015/0009173 A1* | 1/2015 | Rodzevski ............ G06F 3/0414 345/174 |

* cited by examiner

| Event | DESCRIPTION |
|---|---|
| STATUS_SENSOR_ERROR | SENSOR RELATED H/W, S/W ISSUE |
| STATUS_UNKNOWN | UNKNOWN ERROR |
| STATUS_USER_CANCELLED | USER CANCEL |
| STATUS_TIMEOUT | TIMEOUT FOR RECOGNITION PROCESS OCCURS |
| STATUS_FINGERCONDITION_GOOD | FINGER STATE CHECK SUCCESS |
| STATUS_FINGERCONDITION_FAIL | FINGER STATE CHECK FAIL |
| STATUS_FINGERCONDITION_DRY | FINGER DRY STATE |
| STATUS_FINGERCONDITION_WET | FINGER OR DEVICE WET |
| STATUS_FINGERCONDITION_POLLUTED | FOREIGN MATERIAL ON FINGER |
| STATUS_FINGERCONDITION_GLOVE | GLOVES WORN STATE |

FIG. 11

TOUCH INPUT PROCESSING METHOD THAT ADJUSTS TOUCH SENSITIVITY BASED ON THE STATE OF A TOUCH OBJECT AND ELECTRONIC DEVICE FOR SUPPORTING THE SAME

CLAIM OF PRIORITY

This application claims the benefit under 35 U.S.C. § 119(a) of a Korean patent application No. 10-2015-0052965, filed on Apr. 15, 2015, and a Korean patent application No. 10-2015-0065395, filed on May 11, 2015 in the Korean Intellectual Property Office, the entire disclosure of which is hereby incorporated by reference.

TECHNICAL FIELD

The present disclosure relates to a touch input processing method.

BACKGROUND

Electronic devices support touch-type input devices such as a touch screen, a touch pad, or a touch key as part of a user interface (UI). These touch-type input devices are implemented in various methods such as a capacitive, resistive, infrared, or ultrasonic methods. For example, a capacitive touch input method may recognize touch by determining a change in capacitance, which occurs by a conductive object, such as, for example, a user's finger or a stylus pen.

However, the capacitive touch input method may malfunction if there is a factor that changes a capacitance on the conductive object (for example, a touch object). For example, when a finger stained with sweat or water contacts the touch screen, or a user wears gloves covering the fingers while contacting the touch screen, a capacitive touch input device may not correctly recognize the contact of a touch object, or may recognize unintended touch coordinates as a contact point. Additionally, a touch input method such as a resistive, infrared or ultrasonic method may malfunction when a touch object such as a finger is stained with water or sweat, or a user wears gloves cover their fingers.

SUMMARY

Accordingly, an aspect of the present disclosure is to provide a method of determining a state of a touch object in correspondence to sensor information according to an approach or contact of a touch object and processing a touch input according to a state of a touch object and an electronic device for supporting the same.

In one aspect of the present disclosure, an electronic device is disclosed, including a first touch sensor configured to detect sensor information from a touch object, and a processor configured to determine a state of the touch object based on analysis of the detected sensor information, and adjust a touch sensitivity for the electronic device according to the determined state of the touch object.

In one aspect of the present disclosure, a method in an electronic device is disclosed, including detecting, via a first touch sensor of the electronic device, sensor information from a touch object, determining via a processor of the electronic device a state of the touch object based on analysis of the detected sensor information, and adjusting a touch sensitivity for the electronic device according to the determined state of the object.

BRIEF DESCRIPTION OF THE DRAWINGS

FIG. 11 is a finger state event table according to various embodiments of the present disclosure;

DETAILED DESCRIPTION

Figure 1:
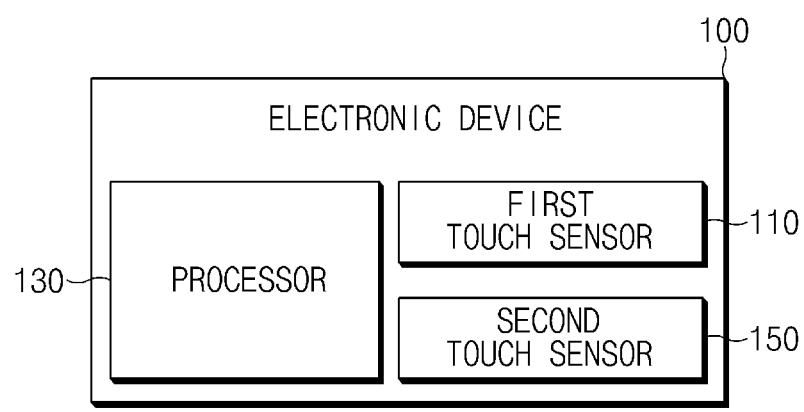
FIG. 1 is a view illustrating a schematic configuration of an electronic device relating to touch input processing according to various embodiments of the present disclosure.

Hereinafter, various embodiments of the present disclosure are disclosed with reference to the accompanying drawings. However, this does not limit various embodiments of the present disclosure to a specific embodiment and it should be understood that the present disclosure covers all the modifications, equivalents, and/or alternatives of this disclosure in terms of the appended claims and their equivalents. With respect to the descriptions of the drawings, like reference numerals refer to like elements.

The term "include," "comprise," and "have", or "may include," or "may comprise" and "may have" used herein indicates disclosed functions, operations, or existence of elements but does not exclude other functions, operations or elements.

For instance, the expression "A or B", or "at least one of A or/and B" may indicate include A, B, or both A and B. For instance, the expression "A or B", or "at least one of A or/and B" may indicate (1) at least one A, (2) at least one B, or (3) both at least one A and at least one B.

The terms such as "1st", "2nd", "first", "second", and the like used herein may refer to modifying various different elements of various embodiments of the present disclosure, but do not limit the elements. For instance, "a first user device" and "a second user device" may indicate different users regardless of the order or the importance. For example, a first component may be referred to as a second component and vice versa without departing from the scope of the present disclosure.

In various embodiments of the present disclosure, it will be understood that when a component (for example, a first component) is referred to as being "(operatively or communicatively) coupled with/to" or "connected to" another component (for example, a second component), the component may be directly connected to the other component or connected through another component (for example, a third component). In various embodiments of the present disclosure, it will be understood that when a component (for example, a first component) is referred to as being "directly connected to" or "directly access" another component (for example, a second component), another component (for example, a third component) does not exist between the component (for example, the first component) and the other component (for example, the second component).

The expression "configured to" used in various embodiments of the present disclosure may be interchangeably used with "suitable for", "having the capacity to", "designed to", "adapted to", "made to", or "capable of" according to a situation, for example. The term "configured to" may not necessarily mean "specifically designed to" in terms of hardware. Instead, the expression "a device configured to" in some situations may mean that the device and another device or part are "capable of". For example, "a processor configured (or set) to perform A, B, and C" in a phrase may mean a dedicated processor (for example, an embedded processor) for performing a corresponding operation or a generic-purpose processor (for example, a CPU or application processor) for performing corresponding operations by executing at least one software program stored in a memory device.

Terms used in various embodiments of the present disclosure are used to describe specific embodiments of the present disclosure, and are not intended to limit the scope of other embodiments. The terms of a singular form may include plural forms unless they have a clearly different meaning in the context. Otherwise indicated herein, all the terms used herein, which include technical or scientific terms, may have the same meaning that is generally understood by a person skilled in the art. In general, the terms defined in the dictionary should be considered to have the same meaning as the contextual meaning of the related art, and, unless clearly defined herein, should not be understood abnormally or as having an excessively formal meaning. In any cases, even the terms defined in this specification cannot be interpreted as excluding embodiments of the present disclosure.

According to various embodiments of the present disclosure, electronic devices may include at least one of smartphones, tablet personal computers (PCs), mobile phones, video phones, electronic book (e-book) readers, desktop personal computers (PCs), laptop personal computers (PCs), netbook computers, workstation server, personal digital assistants (PDAs), portable multimedia player (PMPs), MP3 players, mobile medical devices, cameras, and wearable devices. According to various embodiments of the present disclosure, the wearable devices may include at least one of accessory types (e.g., watches, rings, bracelets, anklets, necklaces, glasses, contact lenses, or head-mounted-devices (HMDs)), fabric or garment integrated types (for example, e-apparel), body-mounted types (for example, skin pads or tattoos), or bio-implantation types (for example, implantable circuits).

According to some embodiments of the present disclosure, an electronic device may be home appliance. The home appliance may include at least one of, for example, televisions, digital video disk (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™ or Google TV™), game consoles (for example, Xbox™ and PlayStation™), electronic dictionaries, electronic keys, camcorders, and electronic picture frames.

According to some embodiments of the present disclosure, an electronic device may include at least one of various medical devices supporting call forwarding service (for example, various portable measurement devices (for example, glucometers, heart rate meters, blood pressure meters, temperature meters, etc.), magnetic resonance angiography (MRA) devices, magnetic resonance imaging (MRI) devices, computed tomography (CT) devices, medical imaging devices, ultrasonic devices, etc.), navigation devices, global navigation satellite system (GNSS), event data recorders (EDRs), flight data recorders (FDRs), vehicle infotainment devices, marine electronic equipment (for example, marine navigation systems, gyro compasses, etc.), avionics, security equipment, vehicle head units, industrial or household robots, financial institutions' automatic teller's machines (ATMs), or stores' point of sales (POS) or internet of things (for example, bulbs, various sensors, electric or gas meters, sprinkler systems, fire alarms, thermostats, street lights, toasters, exercise equipment, hot water tanks, heaters, boilers, etc.).

In various embodiments of the present disclosure, an electronic device may include at least one of part of furniture or buildings/structures supporting call forwarding service, electronic boards, electronic signature receiving devices, projectors, and various measuring instruments (for example, water, electricity, gas, or radio signal measuring instruments). An electronic device according to various embodiments of the present disclosure may be one of the above-mentioned various devices or a combination thereof. Additionally, an electronic device according to an embodiment of the present disclosure may be a flexible electronic device. Additionally, an electronic device according to an embodiment of the present disclosure is not limited to the above-mentioned devices and may include a new kind of an electronic device according to the technology development.

Hereinafter, an electronic device according to various embodiments of the present disclosure will be described in more detail with reference to the accompanying drawings. The term "user" in this disclosure may refer to a person using an electronic device or a device using an electronic device (for example, an artificial intelligent electronic device).

FIG. 1 is a view illustrating a schematic configuration of an electronic device relating to touch input processing according to various embodiments of the present disclosure. An electronic device 100 may adjust a touch input processing method according to a state of a touch object in order to prevent a malfunction of a touch input that occurs due to an abnormal state of the touch object. For example, the electronic device 100 may adjust a touch input processing method in order to prevent a ghost touch phenomenon that occurs due to the presence of water or sweat on a touch object used to contact a touch screen, that is, a phenomenon in which a touch screen recognizes an unintended area touch as an intended touch.

In order to perform the above-mentioned function, the electronic device 100 may collect sensor information according to an approach or contact of a touch object and determine a state of the touch object by analyzing the collected sensor information. In relation to this, referring to FIG. 1, the electronic device 100 may include a first touch sensor 110, a second touch sensor 150, and a processor 130.

The first touch sensor 110 may collect sensor information corresponding to an approach or contact of a touch object. For example, the first touch sensor 110 may collect touch information calculated by a change in capacitance or a change in pressure, which corresponds to an approach or contact of the touch object. According to an embodiment of the present disclosure, the first touch sensor 110 may include a fingerprint recognition sensor (or a fingerprint sensor), a tactile sensor, or a pH concentration sensor. For example, when including the fingerprint recognition sensor, the first touch sensor 110 may collect fingerprint information on the lengths, directions, or specific points (for example, points where ridges are branched, points where ridges are connected, or points where ridges end) of ridges included in the user's fingerprint. Additionally, when including the tactile sensor, the first touch sensor 110 may collect contact state information such as the intensity, direction or pressure distribution of a contact force corresponding to the contact of the touch object. According to various embodiments of the present disclosure, when including the pH concentration sensor, the first touch sensor 110 may collect information such as pH concentration distribution on the contact surface of the touch object. Additionally, the first touch sensor 110 may deliver the collected sensor information to the processor 130.

One or more sensors included in the first touch sensor 110 may be disposed in a predetermined area of the electronic device 100. For example, the fingerprint recognition sensor may be disposed in a lower end area of the front part of the electronic device 100 or an upper end area of the rear part. According to various embodiments of the present disclosure, the fingerprint recognition sensor may be configured in a form of being included in a specific physical button in the electronic device, for example, a home button or a side button. Additionally, the tactile sensor or the pH concentration sensor may be disposed in a predetermined area of the electronic device 100, similar to the fingerprint recognition sensor. According to an embodiment of the present disclosure, the tactile sensor or the pH concentration sensor may be disposed adjacent to the fingerprint recognition sensor.

The second touch sensor 150 may include a configuration identical or similar to that of the first touch sensor 110. For example, the second touch sensor 150 may collect sensor information corresponding to an approach or contact of a touch object. According to various embodiments of the present disclosure, the second touch sensor 150 may be configured in a panel form and included in a touch screen panel TSP.

The processor 130 may determine a state of a touch object by analyzing the collected sensor information. According to an embodiment of the present disclosure, the processor 130 may determine a state of a touch object by comparing normal state information of the touch object and the sensor information. For example, the processor 130 may compare the normal state information of the touch object with the collected sensor information and when a similarity between information is less than a predetermined ratio, determine that the state of the touch object is an abnormal state.

The normal state information may include sensor information collected from a state (for example, a normal state) in which a foreign material (for example, water, sweat, dust, sand, dirt, or gloves, etc.) is not detected between the first touch sensor 110 and a touch object based on the first touch sensor 110. For example, the normal state information may be user's fingerprint information collected from a state in which a finger is not stained with water, sweat, dust, sand, or dirt or a gloves unworn state based on a fingerprint recognition sensor. Additionally, the normal state information may be contact state information, pH concentration distribution information, or touch information, which is collected from the normal state. According to various embodiments of the present disclosure, the normal state information may be information collected at the cold start of the electronic device 100 or a specific time point that satisfies a specific condition. For example, the normal state information may be information stored at a time point that a user's fingerprint is registered in relation to the use of a fingerprint recognition function.

When a state of a touch object is an abnormal state, the processor 130 may classify the state of the touch object in more detail. For example, the processor 130 may classify a state of a touch object into at least one of a water film state, a pollution film state, or a "gloves worn" state. The water film state may represent a state in which a touch object is stained with a foreign material including moisture such as water or sweat and the pollution film state may represent a state in which a touch object is stained with a foreign material not including moisture such as dust, sand, or dirt. Then, when a user performs a touch operation while wearing gloves, it may be classified as the "gloves worn" state.

According to various embodiments of the present disclosure, the processor 130 may classify a state of a touch object in more detail by using pattern information of the foreign material. According to an embodiment of the present disclosure, the processor 130 may compare the sensor information with the pattern information of the foreign material and when a similarity between information is greater than a predetermined ratio, classify the state of the touch object according to a type of the foreign material. For example, when the foreign material includes a material including moisture such as water or sweat, the processor 130 may determine the state of the object as a water film state. Additionally, when the foreign material is a material used for gloves and the similarity is greater than a specified ratio (for example, 90%), the processor 130 may determine the state of the touch object as a gloves worn state.

In relation to this, the pattern information of the foreign material may be information obtained by sensing the foreign material through one or more sensors included in the first touch sensor 110. For example, the pattern information of the foreign material may be sensor information of the foreign material collected while a fingerprint recognition sensor performs a fingerprint function. Additionally, the pattern information of the foreign material may include information such as pH concentration information, surface state information, or electrical conductivity of the foreign material.

According to various embodiments of the present disclosure, the pattern information of the foreign material may frequency spectrum information of the foreign material. In this case, the processor 130 may convert the sensor information into frequency spectrum information and compare it with the frequency spectrum information of the foreign material. Additionally, when a similarity between the frequency spectrum information is greater than a predetermined ratio, the processor 130 may classify a state of a touch object into a water film state, a pollution film state, or a gloves worn state according to the type of foreign material.

According to various embodiments of the present disclosure, as the state of the touch object is determined by using the pattern information of the foreign material, the processor 130 may distinguish a touch input state by a hovering operation from a gloves worn state. For example, the processor 130 may convert sensor information according to a hovering operation into frequency spectrum information and compare it with the frequency spectrum information of gloves. In this case, the processor 130 may distinguish a gloves worn state from a touch input state by a hovering operation by comparing the size of a specific frequency that the frequency spectrum information represents or a range of a frequency having more than a predetermined size.

According to various embodiments of the present disclosure, the processor 130 may classify a state of a touch object in more detail through a user input. According to an embodiment of the present disclosure, the processor 130 may determine a state of a touch object by comparing normal state information of the touch object and the sensor information. For example, the processor 130 may perform a control to output a touch function selection object including items of a general function corresponding to a normal state of a touch object, a water film function corresponding to a water film state, a pollution film function corresponding to a pollution film state, or a gloves function corresponding to a gloves worn state. Additionally, the processor 130 may determine a state corresponding to a selected item as a state of a touch object.

The processor 130 may adjust a touch input processing method according to the classified state of the touch object. According to an embodiment of the present disclosure, the processor 130 may adjust a touch sensitivity according to a state of a touch object. For example, when a touch object is determined as a water film state, the processor 130 may prevent a phenomenon that a material including moisture such as water or sweat is recognized as a touch input, by reducing the touch sensitivity. Additionally, the processor 130 may adjust a touch area (for example, an area where a display object is touched) of a display object according to a state of a touch object and correspondingly, adjust the size or position of the display object. For example, when it is determined that a touch object is in a water film state, the processor 130 may adjust the touch area of a display object to be broader by a predetermined ratio and correspondingly adjust the size of the display object to be larger by a predetermined ratio.

Figure 2:
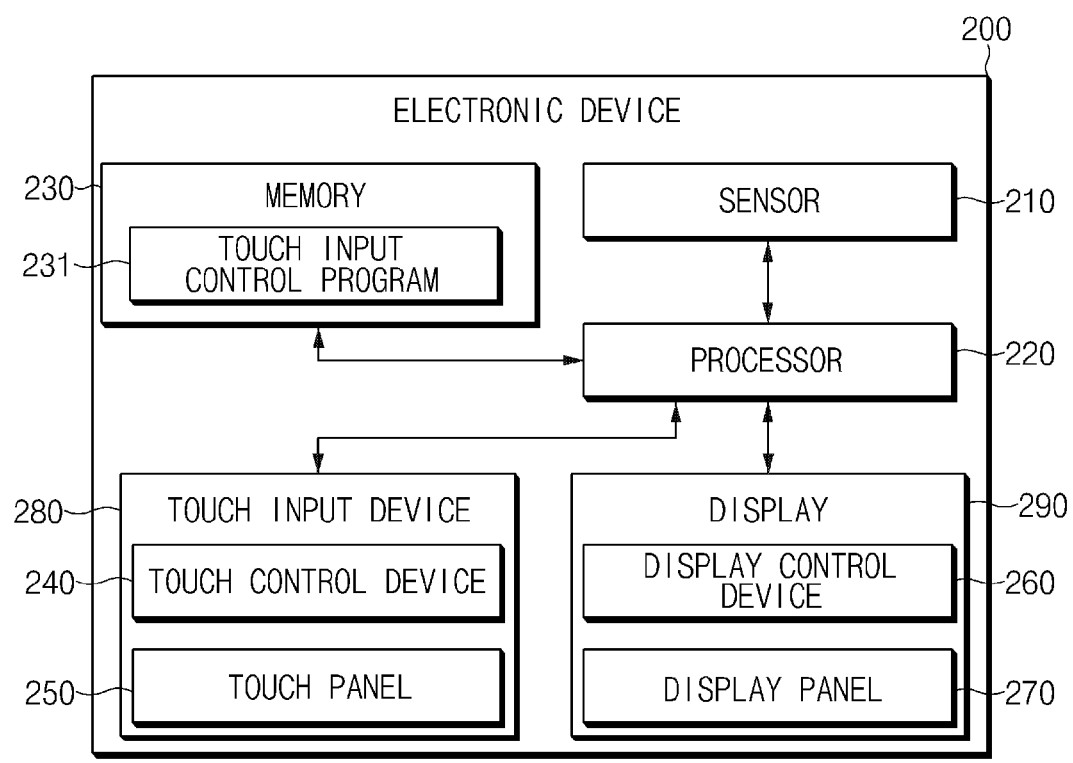
FIG. 2 is a block diagram of an electronic device relating to touch input processing according to various embodiments of the present disclosure.

FIG. 2 is a block diagram of an electronic device 200 relating to touch input processing according to various embodiments of the present disclosure. The electronic device 200 may be in a form that the electronic device 100 of FIG. 1 expands.

Referring to FIG. 2, the electronic device 200 may include a sensor 210, a processor 220, a memory 230, a touch input device 280, and a display 290. According to an embodiment of the present disclosure, the electronic device 200 may omit at least one of the components or may additionally include a different component. For example, the electronic device 200 may further include a voice output device.

The sensor 210 may include a configuration identical or similar to that of the first touch sensor 110. For example, the sensor 210, as a biometric recognition sensor, may include at least one of a fingerprint recognition sensor, a tactile sensor, or a pH concentration sensor. The sensor 210 may deliver, to the processor 220, sensor information collected by sensing a touch object at a specific time point that satisfies a specific condition. According to an embodiment of the present disclosure, when including the fingerprint recognition sensor, the sensor 210 may determine a finger state by delivering the collected information to the processor 220 during the performance of a fingerprint recognition function. According to various embodiments of the present disclosure, the sensor 210 may include a touch sensor (for example, the touch input device 280) configured in a panel form. In this case, the sensor 210 may deliver, to the processor 220, touch information collected during the performance of a touch recognition function, at a specific time point that satisfies a specific condition. For example, the sensor 210 may determine a state of a touch object by delivering, to the processor 220, sensor information corresponding to a first touch operation of the touch object sensed based on the touch sensor. Accordingly, touch information sensed later including the specific time point may be delivered to the touch input device 280 and processed according to a state of a touch object.

According to various embodiments of the present disclosure, the sensor 210 may update a state of a touch object by delivering, to the processor 220, sensor information that is newly collected at a time point that more than a specified time elapses based on a time point that the state of the touch object is determined. For example, the fingerprint recognition sensor may collect fingerprint information again and deliver it to the processor 220 when a specified time elapses based on a time point that a fingerprint state is determined. In relation to this, the processor 220 may perform a control to output a display object or voice information for inducing a finger to approach or contact the fingerprint recognition sensor. Additionally, the touch sensor may deliver, to the processor 220, touch information sensed at a time point that more than a specified time elapses after a first touch operation.

According to various embodiments of the present disclosure, a function for determining and updating the state of the touch object may be performed based on a plurality of sensors. For example, when a state of touch object is determined first, a touch object state determination function may be performed by using fingerprint information collected based on the fingerprint recognition sensor and then, when a state of a touch object is updated, a touch object state update function may be performed by using touch information collected based on the touch sensor. Accordingly, in order to update a state of a touch object, a user may omit an additional operation that a finger approaches or contacts a fingerprint recognition sensor.

According to various embodiments of the present disclosure, the sensor 210 may deliver an event occurring during a collection process of the sensor information (for example, a finger recognition event) to the processor 220. For example, the sensor 210 may analyze an event (for example, a finger recognition success event) according to the collection success of the sensor information and deliver it to the processor 220. According to various embodiments of the present disclosure, the processor 220 may map the event (for example, a finger recognition event) to a touch object state event (for example, a finger state event) (or, information corresponding thereto) and manage it. Additionally, the processor 220 may deliver the mapped event (or an instruction corresponding thereto) to related components (for example, the touch input device 280 or the display 290).

The processor 220 may execute calculation or data processing for control and/or communication of at least one another component included in the electronic device 200. According to an embodiment of the present disclosure, the processor 220 may control a plurality of hardware or software components connected thereto and also perform various data processing and calculations by executing one or more application programs stored in the memory 230. For example, the processor may perform the same or similar operation and function to the processor 130 of FIG. 1 by executing a touch input control program 231 stored in the memory 230.

According to various embodiments of the present disclosure, the processor 220 may activate the sensor 210. According to an embodiment of the present disclosure, the processor 220 may activate a fingerprint recognition sensor in relation to the performance of a fingerprint recognition function. Additionally, the processor 220 may activate the sensor 210 at a use start time point of the electronic device 200, for example, at a time point that the screen of the electronic device 200 is changed into a turn-on state. Additionally, the electronic device 200 may activate the sensor 210 when a specific application program is executed or a specific application program provides a request.

According to various embodiments of the present disclosure, the processor 220 may determine a state of a touch object by analyzing sensor information delivered from the sensor 210. According to an embodiment of the present disclosure, in relation to the implemented operation or function performance of the touch input control program 231, the processor 220 may receive sensor information from the sensor 210 and determine a state of a touch object by analyzing the delivered sensor information.

According to various embodiments of the present disclosure, the processor 220 may deliver a specified touch object state event (or an instruction corresponding thereto) to a corresponding component included in the electronic device 200 according to the determined state of the touch object. For example, when a touch object is in a water film state, the processor 220 may deliver a water film state event (or an instruction corresponding thereto) to the touch input device 280 or the display 290. In relation to this, when the state of the touch object is a normal state, the touch object state event may be specified as a normal state event and when it is a water film state, specified as a water film state event. Additionally, when the state of the touch object is a pollution film state, the touch object state event may be specified as a pollution film state event and when it is a gloves worn state, specified as a gloves worn state event.

The memory 230 may store instructions or data relating to at least one another component of the electronic device 200. According to an embodiment of the present disclosure, the memory 230 may store the touch input control program 231. The touch input control program 231 may include touch input processing related modules, programs, routines, sets of instructions, or processes.

According to various embodiments of the present disclosure, the memory 230 may store normal state information of a touch object. For example, the memory 230 may store sensor information collected when a touch object is in a normal state based on the sensor 210. According to various embodiments of the present disclosure, the memory 230 may store pattern information of various foreign materials. For example, the memory 230 may store sensor information obtained by sensing the foreign material (for example, water, sweat, dust, sand, dirt or gloves) based on the sensor 210. Additionally, the memory 230 may store the pH concentration, surface state, electrical conductivity, or frequency spectrum information of the foreign material.

According to various embodiments of the present disclosure, the memory 230 may store information relating to a state of a touch object, in relation to the performance of an operation or function implemented in the touch input control program 231. For example, the memory 230 may store the determined state of a touch object, a state determination time point (for example, a time point that a state of a touch object is determined), a level (for example, sensitivity) of a adjusted touch sensitivity, or display setting information of the adjusted sizes or positions of display objects.

The touch input device 280 may collect sensor information corresponding to an approach or contact of a touch object. The touch input device 280 may include a configuration identical or similar to that of the second touch sensor 150 of FIG. 1. The touch input device 280 may include a touch control device 240 and a touch panel 250.

The touch control device 240 may perform the control and data processing of the touch panel 250 in relation to a touch recognition function. According to an embodiment of the present disclosure, the touch control device 240 may set a touch sensitivity of the touch panel 250. For example, in the case of a capacitive touch input method, the touch control device 240 may set a range of a capacitance change size processed as a valid touch input.

According to various embodiments of the present disclosure, the touch control device 240 may receive touch information (for example, touch coordinates, touch time, or touch intensity) from the touch panel 250. Additionally, the touch control device 240 may determine whether a touch input corresponding to the received touch information is a valid touch input. For example, the touch control device 240 may determine whether there is a valid touch input by comparing a touch intensity (for example, a capacitance change size) with a range of a touch intensity corresponding to the touch sensitivity. Additionally, the touch control device 240 may deliver, to the processor 220, touch information corresponding to a touch input determined as a valid touch input.

According to various embodiments of the present disclosure, the touch control device 240 may receive a touch object state event (or an instruction corresponding thereto) from the processor 220 and set a touch function according to the touch object state event (or an instruction corresponding thereto). For example, when the touch object state vent is a normal state event, the touch control device 240 may set the touch function as a general function and when the touch object state event is a water film state event, a pollution film state event, or a gloves worn state event, set the touch function as a water film function, a pollution film function, or a gloves function, respectively.

In relation to this, the touch function may include a function for determining the validity of a touch input by varying a touch sensitivity of the touch panel 250 according to a state of a touch object. According to an embodiment of the present disclosure, when the touch function is set to a water film function, by lowering the touch sensitivity of the touch panel 250, the touch control device 240 may invalidate a touch input by water or sweat or noise-process it. For example, the touch control device 240 may increase a capacitance change size processed as a valid touch input. Accordingly, even if a material (for example, water or sweat stained on a touch object), which causes a capacitance change on the touch panel 250, is dropped at a point adjacent to a touch object and contacts the touch panel 250 or is spread to an adjacent area on the basis of a contact point of a touch object, the touch control device 240 may invalidate a low capacitance change by water or sweat or noise-process it. Additionally, when the touch function is set to a pollution film function or a gloves function, the touch control device 240 may increase the touch sensitivity of the touch panel 250. Accordingly, even if a capacitance change size corresponding to an approach or contact of a touch object is measured low due to dust, sand, dirt, or gloves, the touch control device 240 may process it as a valid touch input.

The touch panel 250 may perform a function for detecting an approach or contact of a touch object through capacitive, resistive, infrared, or ultrasonic methods. The touch panel 250 may deliver touch information corresponding to an approach or contact of a detected touch object, for example, touch coordinates, touch time, or touch intensity, to the touch control device 240. According to various embodiments of the present disclosure, the touch panel 250 may be configured in a form of including the touch control device 240.

According to various embodiments of the present disclosure, the touch input device 280 may deliver, to the processor 220, sensor information collected in correspondence to an approach or contact of a touch object. In this case, the processor 220 may determine a state of a touch object by using the sensor information. Additionally, the processor 220 may deliver a touch object state event (or an instruction corresponding thereto) corresponding to the state of the touch object to at least one of the sensor 210 or the touch input device 280. When receiving the touch object state event (or an instruction corresponding thereto) from the processor 220, the sensor 210 or the touch input device 280 may perform a calibration task (for example, touch point adjustment or touch sensitivity setting) relating to the function performance of the sensor 210 or the touch input device 280 according to the touch object state event (or an instruction corresponding thereto).

The display 290 may output data to a screen visually. The display 290 may display various contents (for example, texts, images, videos, icons, symbols, and so on). The display 290 may include a display control device 260 and a display panel 270.

The display control device 260 may perform the control and data processing of the display panel 270 in relation to a screen display function. According to an embodiment of the present disclosure, the display control device 260 may receive display object information from the processor 220 and perform a control to output it to the display panel 270.

According to various embodiments of the present disclosure, the touch control device 240 may receive a touch object state event (or an instruction corresponding thereto) from the processor 220 and control the output of the display object according to the touch object state event (or an instruction corresponding thereto). According to an embodiment of the present disclosure, the display control device 260 may adjust and display the size or position of the display object according to the touch object state event (or an instruction corresponding thereto). For example, when the touch object state vent is a water film state event, the display control device 260 may adjust and display the size of the display object to be larger by a predetermined ratio.

According to various embodiments of the present disclosure, the display control device 260 may receive information of a touch function selection object including items corresponding to various states of a touch object from the processor 220 and perform a control to display it on the display panel 270. For example, the display control device 260 may perform a control to display, on the display panel 270, a touch function selection object including items of a general function corresponding to a normal state of a touch object, a water film function corresponding to a water film state, a pollution film function corresponding to a pollution film state, or a gloves function corresponding to a gloves worn state.

According to various embodiments of the present disclosure, the display control device 260 may perform a control to display, on the display panel 270, a touch object state icon (or image) representing a state of a touch object. The display control device 260 may perform a control to display the image of the touch object state icon differently according to a state of a touch object. For example, the display control device 260 may perform a control to differently display the form, color or size of the image that represents the touch object state icon according to a state of a touch object. According to an embodiment of the present disclosure, the display control device 260 may vary and display the display on/off, transparency, or background color of the touch object state icon according to a state (for example, a turn-on state or a turn-off state) of a touch input processing function. For example, when a touch input processing function is not used (for example, a turn-off state), the display control device 260 may not output the touch object state icon to a screen. Additionally, when a touch input processing function is used (for example, a turn-on state), the display control device 260 may vary and display the transparency or background color of the touch object state icon set to an image having a different form, color, or size according to a state of a touch object.

The display panel 270 may display various contents (for example, display objects such as texts, images, videos, icons, symbols, and so on) to a user. The display panel 270 may be implemented to be flexible, transparent, or wearable. According to various embodiments of the present disclosure, the display panel 270 may be configured in a form of including the display control device 260. According to an embodiment of the present disclosure, the display panel 270 and the touch panel 250 may be configured with one module. According to an embodiment of the present disclosure, the touch input device 280 and the display 290 may be configured with one module.

According to various embodiments of the present disclosure, the processor may directly adjust the touch sensitivity of the touch panel 250 or adjust the size or position of a display object and display it on the display panel 270 instead of delivering a touch object state event (or an instruction corresponding thereto) to the touch control device 240 or the display control device 260 to adjust a touch setting. Additionally, the processor 220 may perform a control to display the touch function selection object or the touch object state (or image) on the display panel 270.

According to various embodiments of the present disclosure, the electronic device 200 may further include a voice output device. In this case, the voice output device may output voice information relating to a state of a touch object. For example, the voice output device may output voice information relating to a state of a touch object at a time point that the state of the touch is determined or at a time point that a touch input processing method is adjusted according to the state of the touch object.

As mentioned above, according to various embodiments of the present disclosure, an electronic device (for example, the electronic device 200) may include: a first touch sensor (for example, the sensor 210) configured to collect sensor information by sensing a touch object; a processor (for example, the processor 220) configured to determine a state of the touch object based on an analyzed result of the sensor information; and a second touch sensor (for example, the touch input device 280) having a touch sensitivity adjusted according to the state of the touch object.

According to various embodiments of the present disclosure, the first touch sensor may include at least one of a fingerprint recognition sensor, a tactile sensor, a pH concentration sensor, or a touch sensor.

According to various embodiments of the present disclosure, the processor may determine the state of the touch object by comparing normal state information corresponding to a state that a foreign material is not detected between the touch object and the first touch sensor and pattern information of the foreign material including at least one of information obtained by sensing the foreign material based on the first touch sensor, pH concentration information of the foreign material, surface state information of the foreign material, electrical conductivity information of the foreign material, or frequency spectrum information of the foreign material with the sensor information.

According to various embodiments of the present disclosure, the processor may adjust a touch area of display objects outputted to a display (for example, the display 290) according to the state of the touch object.

According to various embodiments of the present disclosure, the processor changes at least one of a size or position of the display objects to correspond to the touch area.

According to various embodiments of the present disclosure, the processor may display a touch function selection object including at least one item corresponding to the state of the touch object on a display and when any one item of the at last one item included in the touch function selection object is selected, adjust a touch sensitivity of the second touch sensor according to the state of the touch object corresponding to the selected item.

According to various embodiments of the present disclosure, the processor may display the touch function selection object at a time point that a screen of the electronic device changes from a turn-off state into a turn-on state, at a time point that a touch input processing function changes from a turn-off state into a turn-on state, at a time point that a specific physical button included in the electronic device is selected, at a time point that a specific application program included in the electronic device is executed or the specific application program provides a request, at a time point that while a predetermined area of the screen is pressed by the touch object, the touch object moves in a predetermined direction by a predetermined distance within a predetermined time, or at a time point that the electronic device moves or rotates at a predetermined interval in a predetermined direction by a predetermined number of times.

According to various embodiments of the present disclosure, the processor may update the state of the touch object based on sensor information collected by sensing the touch object when a specified time elapses based on a time point for determining the state of the touch object and the second touch sensor may adjust a touch sensitivity according to the updated state of the touch object.

According to various embodiments of the present disclosure, the processor may display an icon indicating the state of the touch object in a predetermined area of a display and change at least one of a form of the icon, a color of the icon, or a size of the icon according to the state of the touch object.

According to various embodiments of the present disclosure, when the state of the touch object is changed, the processor may output at least one of an object including at least one of a text, an image, or an icon relating to a state change of the touch object or a voice information relating to the state change of the touch object.

Figure 3:
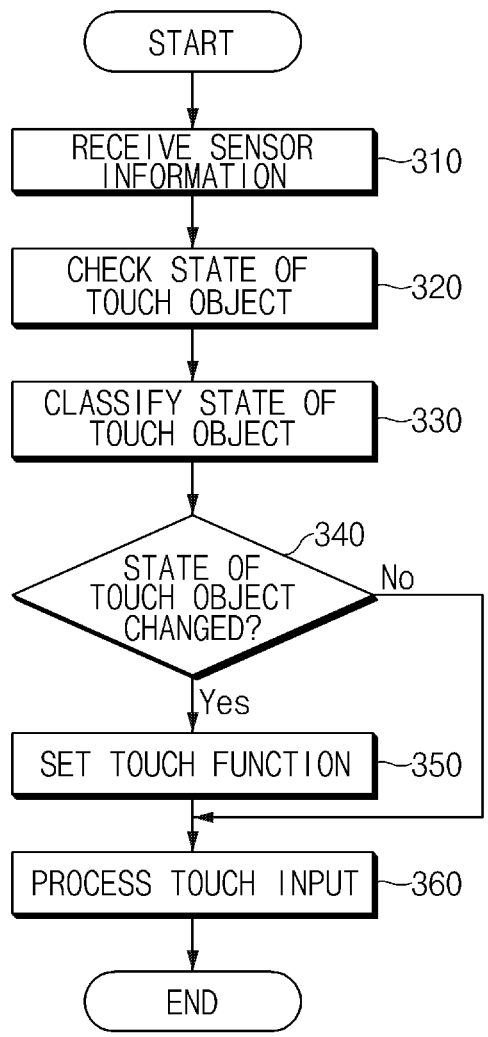
FIG. 3 is a flowchart illustrating an operating method of an electronic device relating to a method of processing a touch input in correspondence to sensor information according to various embodiments of the present disclosure.

FIG. 3 is a flowchart illustrating an operating method of an electronic device relating to a method of processing a touch input in correspondence to sensor information according to various embodiments of the present disclosure. According to various embodiments of the present disclosure, an electronic device (for example, the electronic device 200) may activate a sensor (for example, the sensor 210 of FIG. 2) at a time point that a screen changes from a turn-off state into a turn-on state or at time point that a specific application program included in the electronic device is executed or a specific application program provides a request.

Referring to FIG. 3, in operation 310, the electronic device may receive sensor information corresponding to an approach or contact of a touch object from the sensor. For example, the electronic device may receive fingerprint information on the lengths, directions, or specific points of ridges included in a user's fingerprint from a fingerprint recognition sensor, receive contact state information including information such as the intensity, direction or pressure distribution of a contact force corresponding to the contact of a touch object from a tactile sensor, receive information such as pH concentration distribution on a contact surface of a touch object from a pH concentration sensor, or receive touch information determined as a capacitance change or a pressure change according to an approach or contact of a touch object from a touch sensor.

In relation to the receiving of the sensor information, the electronic device may receive the sensor information at a specific time that satisfies a specific condition. According to an embodiment of the present disclosure, the electronic device may receive fingerprint information collected at a time point that a user's fingerprint is recognized in relation to a fingerprint recognition function, from the fingerprint recognition sensor. According to various embodiments of the present disclosure, the electronic device may receive the sensor information corresponding to the first touch operation of a touch object sensed based on the touch sensor. Additionally, the electronic device may receive the sensor information corresponding to a touch operation sensed at a time point that more than a specified time elapses after the first touch operation.

When receiving the sensor information, in operation 320, the electronic device may check the state of the touch object by analyzing the sensor information. According to an embodiment of the present disclosure, the electronic device may check the state of the touch object by comparing normal state information of the touch object stored in a storage medium (for example, the memory of FIG. 2) and the received sensor information. For example, the electronic device may check a finger state by comparing fingerprint information received from the fingerprint recognition sensor and stored fingerprint information (for example, fingerprint information collected in a state that no foreign material is detected between a finger and a fingerprint recognition sensor) indicating a normal state, as retrieved from the storage medium.

According to various embodiments of the present disclosure, the fingerprint recognition sensor may determine a user's finger state by internally analyzing user's fingerprint information. Additionally, the fingerprint recognition sensor may deliver a finger state event (or information corresponding thereto) corresponding to a user's finger state to an electronic device, and the electronic device may check a finger state based on the finger state event (or information corresponding thereto). Additionally, the fingerprint recognition sensor may deliver a fingerprint recognition event occurring during a user's fingerprint information collection process to an electronic device. In this case, the electronic device may map the fingerprint recognition event to a finger state event (or information corresponding thereto) and manage it. During this process, the electronic device may check a finger state based on the finger state event (or information corresponding thereto).

According to various embodiments of the present disclosure, when the state of the touch object is a normal state, operation 330 may be skipped. When the state of the touch object is not a normal state, in operation 330, the electronic device may classify the state of the touch object in detail. For example, the electronic device may classify the state of the touch object into a water film state, a pollution film state, or a gloves worn state. In relation to this, a method of classifying a state of a touch object in detail may include a method of using the sensor information and a method of using the touch function selection object. An operating method of an electronic device relating to the method of classifying a state of a touch object will be described with an embodiment later.

In operation 340, the electronic device may determine whether the state of the touch object is changed. For example, the electronic device may check the state of the touch object that is determined before and stored in the storage medium. The electronic device may determine whether a change occurs by comparing the state of the touch object stored in the storage medium and a state of a touch object that is determined newly. When information relating to a state of a touch object is not stored in the storage medium, the electronic device may store a newly determined state of a touch object and a state determination time point in the storage medium. When information relating to a state of a touch object is not stored in the storage medium, the electronic device may store a newly determined state of a touch object and a state determination time point in the storage medium.

When the state of the touch object is changed, in operation 350, the electronic device may perform a setting of a touch function according to the state of the touch object. For example, the electronic device may set the touch function with a water film state, a pollution film state, or a gloves worn state according to the state of the touch object. According to various embodiments of the present disclosure, the electronic device may adjust a touch sensitivity of a touch input device (for example, the touch input device 280 of FIG. 2) according to the set touch function. According to various embodiments of the present disclosure, the electronic device may deliver information relating to the set touch function to the touch input device. For example, the electronic device may deliver information relating to the set touch function in an instruction form to the touch input device. The touch input device may perform a calibration task (for example, touch point adjustment or touch sensitivity setting) relating to the function performance of the touch input device according to the delivered information. Additionally, the electronic device may adjust a touch area of a display object according to a state of a touch object and correspondingly, control an output state such as the size or position of the display object.

When the state of the touch object is not changed, the electronic device may maintain a previously set configuration of the touch function. For example, the electronic device may maintain the touch sensitivity of the touch input device and maintain the output state of the display object as it is. In operation 360, the electronic device may process a touch input utilizing the now-active configuration for an approach or contact of a touch object, which is detected at a time point that the sensor information is received and after that according to a set touch function.

According to various embodiments of the present disclosure, after executing operation 310, the electronic device may perform another operation at a time point that a specified time elapses based on the state determination time point stored in the storage medium. For example, the electronic device may newly receive sensor information corresponding to an approach or contact of a touch object and update the state of the touch object based on the received sensor information. Accordingly, the electronic device may more accurately determine a state change of a touch object and adjust a touch input processing method according to the state change of the touch object.

According to various embodiments of the present disclosure, a method of classifying a state of a touch object in detail may include a method of using sensor information corresponding to an approach or contact of a touch object collected based on a sensor (for example, the sensor 210 of FIG. 2) and a method of using a touch function selection object including items corresponding to various states of a touch object.

Figure 4:
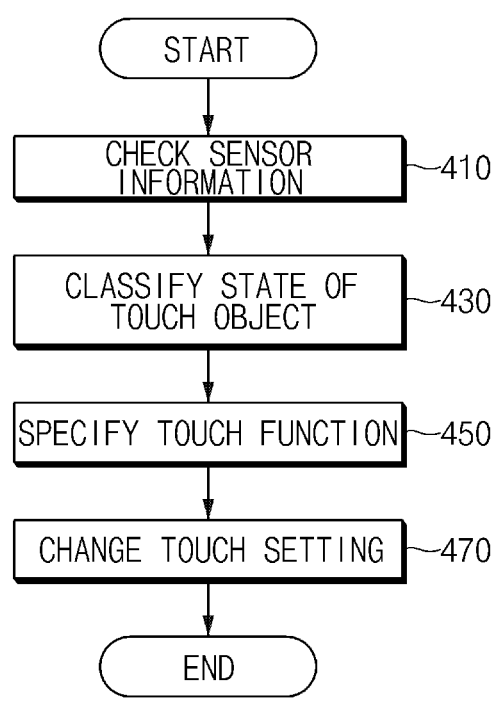
FIG. 4 is a flowchart illustrating an operating method of an electronic device relating to a method of setting a touch function by using sensor information according to various embodiments of the present disclosure.

FIG. 4 is a flowchart illustrating an operating method of an electronic device relating to a method of setting a touch function by using sensor information according to various embodiments of the present disclosure.

First, referring to FIG. 4, in operation 410, the electronic device may check sensor information corresponding to an approach or contact of a touch object, which is collected based on a sensor. For example, the sensor information may include fingerprint information collected based on a fingerprint recognition sensor, contact state information collected based on a tactile sensor, pH concentration distribution information of a contact surface collected based on a pH concentration sensor, or touch information collected based on a touch sensor.

In operation 430, the electronic device may classify a state of a touch object in detail by analyzing the sensor information. According to an embodiment of the present disclosure, the electronic device may classify a state of a touch object in detail by comparing pattern information of various foreign materials stored in a storage medium (for example, the memory of FIG. 2) and the sensor information. For example, the electronic device may determine a similarity between the pattern information of the various foreign materials and the sensor information. Through this, the electronic device may classify the state of the touch object into a water film state, a pollution film state, or a gloves worn state.

When the state of the touch object is classified, in operation 450, the electronic device may specify a touch function according to the state of the touch object. For example, when the state of the touch object is a normal state, the electronic device may specify it with a normal function, and when the state of the touch object is a water film state, the electronic device may specify it with a water film function. Additionally, when the state of the touch object is a pollution film state, the electronic device may specify it with a pollution film function, and when the state of the touch object is a gloves worn state, the electronic device may specify it with a gloves function.

When the touch function is specified, in operation 470, the electronic device may adjust a touch input processing method according to the specified touch function. For example, the electronic device may change a touch setting. According to an embodiment of the present disclosure, the electronic device may adjust a touch sensitivity of a touch input device (for example, the touch input device 280 of FIG. 2) according to the touch function. For example, when the touch function is specified as a water film function, the electronic device may invalidate a touch input occurring due to water or sweat or noise-process it by adjusting the touch sensitivity of the touch input device to be low. Additionally, when the touch function is specified as a pollution film function or a gloves function, the electronic device may prevent a phenomenon that a touch input is not recognized as a touch intensity corresponding to an approach or contact of a touch object is measured low due to dust, sand, dirt, or gloves, by adjusting the touch sensitivity of the touch input device to be high. According to various embodiments of the present disclosure, the electronic device may deliver information relating to the touch function (for example in an instruction form) to the touch input device and the touch input device may perform a calibration task relating to the function performance of the touch input device according to the delivered information. According to an embodiment of the present disclosure, the touch input device may change an algorithm and a threshold value for a ghost touch recognition that operates internally according to the delivered information.

According to various embodiments of the present disclosure, the electronic device may adjust a touch area of display objects according to the specified touch function. Additionally, the electronic device may adjust an output state such as the sizes or positions of the display objects to correspond to the touch area. For example, when the touch function is specified as the water film function, the electronic device may display the sizes of the display objects largely by a predetermined ratio. Through this, the electronic device may prevent that an unintentional area is selected due to the spread of water or sweat stained on a touch object.

As mentioned above, the electronic device may receive a state of a touch object from a user instead of a method of classifying a state of a touch object in detail by using sensor information collected based on a sensor. For example, the electronic device may induce a user to select a state of a touch object by displaying, on a screen, a touch function selection object including items corresponding to various states of the touch object.

Figure 5:
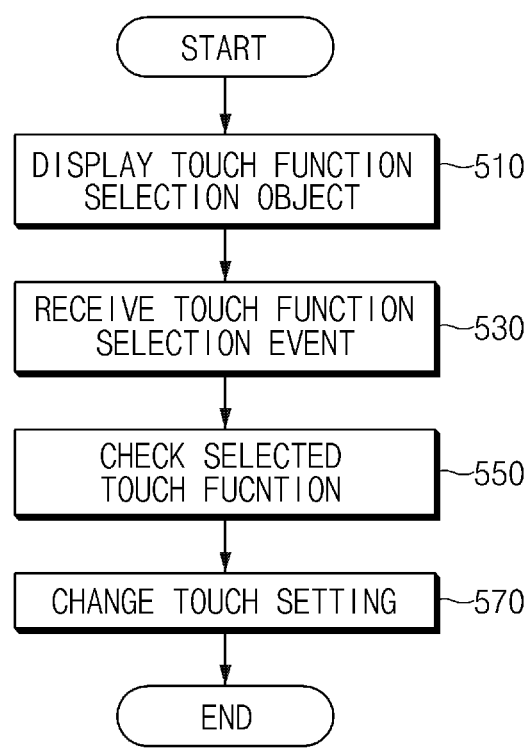
FIG. 5 is a flowchart illustrating an operating method of an electronic device relating to a method of setting a touch function by using a touch function selection object according to various embodiments of the present disclosure.

FIG. 5 is a flowchart illustrating an operating method of an electronic device relating to a method of setting a touch function by using a touch function selection object according to various embodiments of the present disclosure.

Referring to FIG. 5, in operation 510, the electronic device may display the touch function selection object on a screen. In this case, the electronic device may receive a state of a touch object from a user through the touch function selection object. When a user input is not received for more than a predetermined time or a user input is not a valid selection (for example, a selection of any one item among items of the touch function selection object), the electronic device may maintain an output state of the touch function selection object. Alternatively, the electronic device may terminate the output of the touch function selection object and maintain a touch function with previously set information. According to various embodiments of the present disclosure, the electronic device may display, on a screen, an object including texts, images, or icons, which induce a user to select a state of a touch object, or output voice information for inducing a user to select a state of a touch object through a voice output device.

According to various embodiments of the present disclosure, in operation 510, the display of the touch function selection object on the screen may be performed at a specific time point that satisfies a specific condition. According to an embodiment of the present disclosure, the electronic device may display the touch function selection object on a screen at a time point that a screen changes from a turn-off state into a turn-on state, at a time point that the touch input processing function changes from a turn-off state into a turn-on state, at a time point that a specific physical button is selected, at a time point that a specific application program is executed or a specific application program provides a request, at a time point that while a predetermined area of a screen is pressed by a touch object, the touch object moves (for example, a flick operation) in a predetermined direction by a predetermined distance within a predetermined time, or at a time point that the electronic device moves or rotates at a predetermined interval in a predetermined direction by a predetermined number of times.

In operation 530, the electronic device may receive a touch function selection event occurring during the valid selection. For example, the electronic device may receive a normal state event, a water film state event, a pollution film state event, or a gloves worn state event according to the item. When the touch function selection event is received, in operation 550, the electronic device may check a touch function corresponding to the touch function selection event. For example, when the touch function selection event is the normal state event, the water film state event, the pollution film state event, or the gloves worn state event, the electronic device may check them as a normal function, a water film function, a pollution film function, or a gloves function, respectively.

When the selected touch function is checked, in operation 570, the electronic device may adjust a touch input processing method according to the selected touch function. For example, the electronic device may change a touch setting. According to an embodiment of the present disclosure, the electronic device may adjust a touch sensitivity of a touch input device (for example, the touch input device 280 of FIG. 2) according to the selected touch function. Additionally, the electronic device may adjust a touch area of display objects according to the selected touch function and correspondingly, adjust an output state of the display objects.

As mentioned above, according to various embodiments of the present disclosure, a touch input processing method of an electronic device may include: collecting sensor information by sensing a touch object based on a first touch sensor; determining a state of the touch object based on an analyzed result of the sensor information; and adjusting a touch sensitivity of a second touch sensor according to the state of the touch object.

According to various embodiments of the present disclosure, the collecting of the sensor information may include collecting the sensor information corresponding to an approach or contact of the touch object based on at least one of a fingerprint recognition sensor, a tactile sensor, a pH concentration sensor, or a touch sensor.

According to various embodiments of the present disclosure, the determining of the state of the touch object may include comparing normal state information corresponding to a state that a foreign material is not detected between the touch object and the first touch sensor and pattern information of the foreign material including at least one of information obtained by sensing the foreign material based on the first touch sensor, pH concentration information of the foreign material, surface state information of the foreign material, electrical conductivity information of the foreign material, or frequency spectrum information of the foreign material with the sensor information.

According to various embodiments of the present disclosure, the determining of the state of the touch object may further include: displaying a touch function selection object including at least one item corresponding to the state of the touch object on a display; and when any one item of the at last one item included in the touch function selection object is selected, adjusting a touch sensitivity of the second touch sensor according to the state of the touch object corresponding to the selected item.

According to various embodiments of the present disclosure, the displaying of the touch function selection object on the display may further include displaying the touch function selection object at a time point that a screen of the electronic device changes from a turn-off state into a turn-on state, at a time point that a touch input processing function changes from a turn-off state into a turn-on state, at a time point that a specific physical button included in the electronic device is selected, at a time point that a specific application program included in the electronic device is executed or the specific application program provides a request, at a time point that while a predetermined area of the screen is pressed by the touch object, the touch object moves in a predetermined direction by a predetermined distance within a predetermined time, or at a time point that the electronic device moves or rotates at a predetermined interval in a predetermined direction by a predetermined number of times.

According to various embodiments of the present disclosure, the touch input processing method may further include adjusting a touch area of display objects outputted to a display according to the state of the touch object.

According to various embodiments of the present disclosure, the adjusting of the touch area may further include changing at least one of a size or position of the display objects to correspond to the touch area.

According to various embodiments of the present disclosure, the touch input processing method may further include: updating the state of the touch object based on sensor information collected by sensing the touch object when a specified time elapses based on a time point for determining the state of the touch object; and adjusting a touch sensitivity of the second touch sensor according to the updated state of the touch object.

According to various embodiments of the present disclosure, the touch input processing method may further include displaying an icon indicating the state of the touch object in a predetermined area of a display and changing at least one of a form of the icon, a color of the icon, or a size of the icon according to the state of the touch object.

According to various embodiments of the present disclosure, the touch input processing method may further include, when the state of the touch object is changed, outputting at least one of an object including at least one of a text, an image, or an icon relating to a state change of the touch object or a voice information relating to the state change of the touch object.

Figure 6:
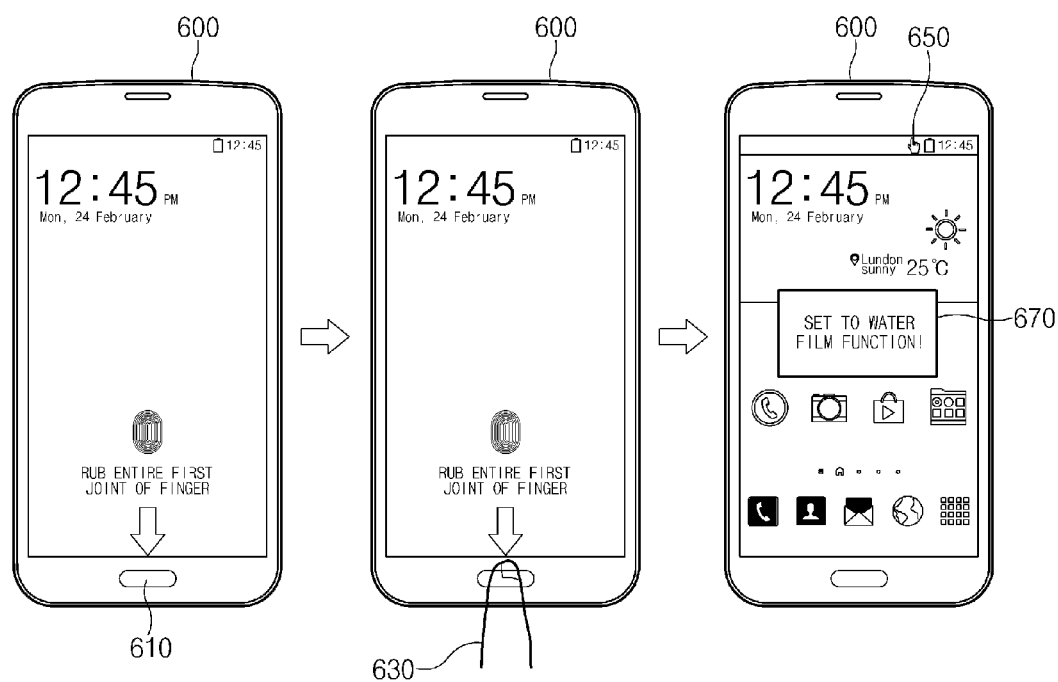
FIG. 6 is a view for determining a state of a touch object based on a fingerprint recognition sensor according to various embodiments of the present disclosure.

FIG. 6 is a view for determining a state of a touch object based on a fingerprint recognition sensor according to various embodiments of the present disclosure.

Referring to FIG. 6, an electronic device 600 may include a physical button (or a physical panel) 610 with a built-in fingerprint recognition sensor. According to an embodiment of the present disclosure, the electronic device 600 may support a user fingerprint recognition function in relation to user authentication. In a state that the screen of the electronic device 600 is turned on, when an input signal for a turn-on state change occurs, the electronic device 600 may activate the fingerprint recognition sensor. Additionally, the electronic device 600 may request a user's finger 630 to approach or contact the physical button 610 with the built-in fingerprint recognition sensor. For example, the electronic device 600 may display, on a screen, an object such as texts, images, or icons for requesting the use of the fingerprint recognition function, or output voice information requesting the use of the fingerprint recognition function through a voice output device.

In relation to the fingerprint recognition function performance, when sensor information is collected based on the fingerprint recognition sensor, the electronic device 600 may determine a state of a touch object by analyzing the sensor information. For example, the electronic device 600 may determine the state of the touch object as a normal state, a water film state, a pollution film state, or a gloves worn state. Additionally, the electronic device 600 may specify a touch function according to the determined state of the touch object. When the touch function is specified, the electronic device 600 may adjust a touch input processing method according to the specified touch function. For example, the electronic device 600 may adjust a touch sensitivity of a touch input device (for example, the touch input device 280 of FIG. 2). Additionally, the electronic device 600 may adjust a touch area of a display object according to the selected touch function and correspondingly, adjust an output state of the display object.

According to various embodiment of the present disclosure, the electronic device 600 may output information corresponding to the specified touch function according to the determined state of the touch object. For example, the electronic device 600 may output, to a screen, a notification object 670 including texts, images, or icons for notifying that it is set to a specified touch function. Additionally, the electronic device 600 may output voice information for notifying that it is set to a specified touch function through a voice output device. According to various embodiments of the present disclosure, the electronic device 600 may display the notification object 670 through a method such as pop-up displays, or screen switching. Referring to the shown drawing, the notification object 670 is shown in a pop-up format. When the notification object 670 is maintained in a displayed state for more than a predetermined time or a user input occurs, the electronic device 600 may perform a control to terminate the screen output of the notification object 670 and output a previous screen. According to an embodiment of the present disclosure, when the notification object 670 is displayed as a pop-up, the electronic device 600 may vary the display via a change in color, transparency, size, or position of the notification object 670, and the changes may further be altered according to a predetermined time interval or a predetermined time.

According to various embodiment of the present disclosure, the electronic device 600 may display a touch object state icon 650 in a predetermined area of a screen, for example, an indication bar or top-most status indicator bar. The electronic device 600 may display the image of the touch object state icon 650 differently according to a state of a touch object. For example, when the state of the touch object is a water film state, the electronic device 600 may display the touch object state icon 650 with a water drop shaped image. Additionally, when the state of the touch object is a gloves worn state, the electronic device 600 may display the touch object state icon 650 with a gloves shaped image.

According to various embodiments of the present disclosure, the electronic device 600 may vary display of the display on/off, transparency, or background color of the touch object state icon 650 according to a state (for example, a turn-on state or a turn-off state) of a touch input processing function. For example, in a state that the touch input processing function is turned off, when an input signal for a change to a turn-on state occurs, the electronic device 600 may display a touch object state icon 650 in a predetermined area of a screen. Additionally, in a state that the touch input processing function is turned on, when an input signal for a change to a turn-off state occurs, the electronic device 600 may not output the touch object state icon 650 to a screen, display the touch object state icon 650 dimly by increasing the transparency of the touch object state icon 650, or display the background color of the touch object state icon 650 differently.

According to various embodiments of the present disclosure, a processor (for example the processor 220 of FIG. 2) included in the electronic device 600 may deliver, to the touch control device (for example, the touch control device 240 of FIG. 2) information collected based on the fingerprint recognition sensor or information obtained by converting the collected information. The touch control device may adjust the touch sensitivity of a touch panel (for example, the touch panel 250 of FIG. 2) by using the information (for example, the collected information or the converted information). According to an embodiment of the present disclosure, the processor delivers an event (for example, a touch object state event or an instruction corresponding thereto) corresponding to the information to the touch input device, so that it may allow the touch input device to adjust a touch sensitivity. For example, the processor may determine whether a state of a touch object is a water film state based on the fingerprint sensor. Additionally, the processor may perform a control to adjust the touch sensitivity of the touch input device by delivering a water film state event corresponding to a water film state (or an instruction corresponding thereto) to the touch input device.

Figure 7:
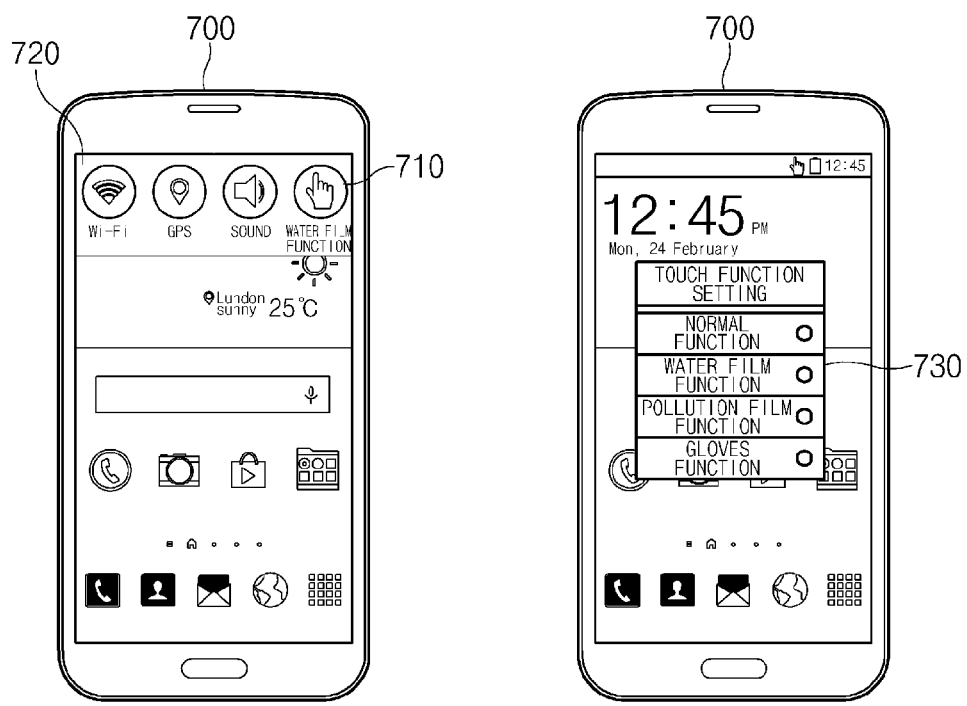
FIG. 7 is a view illustrating a touch function selection object according to various embodiments of the present disclosure.

FIG. 7 is a view illustrating a touch function selection object according to various embodiments of the present disclosure. The electronic device 700 may display a touch function selection object including touch functions corresponding to various states of a touch object as items. For example, the electronic device 700 may display a touch function selection object including a normal function, a water film function, a pollution film function, or a gloves function as items.

Referring to FIG. 7, the electronic device 700 may display the touch function selection object in a sub menu format disposed on an upper end menu 720 (for example, a menu displayed when an upper end area of a screen is pressed and dragged downwardly). For example, the electronic device 700 may display, on the upper end menu 720, a sub menu object 710 including at least one of texts, images, or icons corresponding to a currently set touch function. The electronic device 700 may change and display the text, image, or icon of the sub menu object 710 according to a touch function. According to various embodiments of the present disclosure, when the sub menu object 710 is selected, the electronic device 700 may change the currently set touch function. For example, when the sub menu object 710 is selected, the electronic device 700 may change the currently set touch function into at least one of a normal function, a water film function, a pollution film function, or a gloves function. In this case, the electronic device 700 may change and display the text, image, or icon of the sub menu object 710 in order to correspond to a newly set touch function. The electronic device 700 may vary and display the transparency, color, or background color of the sub menu object 710 according to a state of a touch input processing function.

According to various embodiments of the present disclosure, the electronic device 700 may display a touch function selection object in a pop-up formant in a predetermined area of a screen. For example, the electronic device 700 may display, in a predetermined area of a screen, a pop-up object 730 including the texts, images, or icons of touch functions (for example, a normal function, a water film function, a pollution film function, or a gloves function) as items. According to an embodiment of the present disclosure, the electronic device 700 may configure the items with selectable button objects to allow a user to select any one of the items. Additionally, when any one item is selected from the items, the electronic device 700 may change the currently set touch function into a touch function corresponding to the selected button object.

According to various embodiments of the present disclosure, when the pop-up object 730 is maintained in a displayed state for more than a predetermined time or a user input is received, the electronic device 700 may terminate the screen output of the pop-up object 730. In this case, the electronic device 700 may perform processing to return a resource relating to the pop-up object 730. According to an embodiment of the present disclosure, when the pop-up object 730 is maintained in a displayed state for more than a predetermined time and thus, the screen output is terminated or a user input is not a valid selection (for example, a selection of an item included in the pop-up object 730), the electronic device 700 may perform processing to return to a screen before the pop-up object 730 is displayed. According to various embodiments of the present disclosure, when a user input is a valid selection, the electronic device 700 may change the currently set touch function into the selected touch function. In this case, the electronic device 700 may terminate the screen output of the pop-up object 730 and output, to a screen, an object including texts, images, or icons for notifying that the touch function is changed to the selected touch function. Additionally, the electronic device 700 may output voice information for notifying that the touch function is changed to the selected touch function through a voice output device.

According to various embodiments of the present disclosure, the electronic device 700 may display a touch function selection object through a screen switching method. For example, the electronic device 700 may configure an object such as a list including texts, images, or icons corresponding to touch functions as items display it in full screen.

Figure 8:
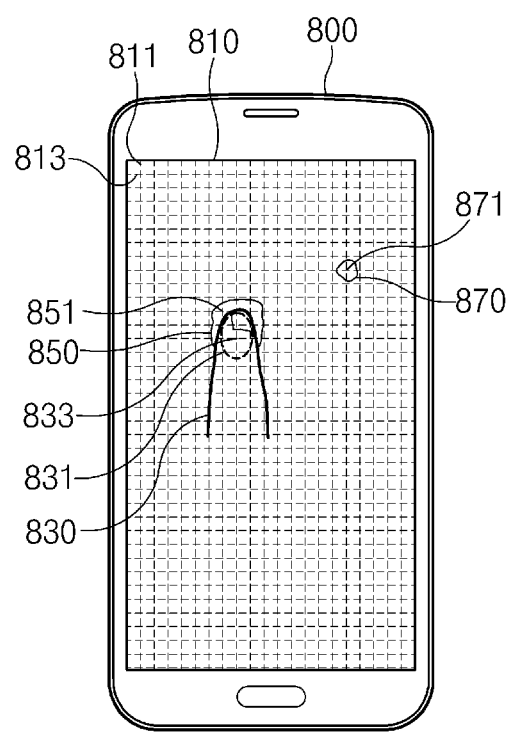
FIG. 8 is a view for adjusting a touch sensitivity depending on a state of a touch object according to various embodiments of the present disclosure.

FIG. 8 is a view for adjusting a touch sensitivity depending on a state of a touch object according to various embodiments of the present disclosure.

Referring to FIG. 8, an electronic device 800 may include a touch panel 810. In relation to the touch panel 810, a screen display area of the electronic device 800 is divided in vertical and horizontal directions so that it may be configured to include at least one cell utilizing a lattice format. For example, the touch panel 810 may be configured with a plurality of cells occupying a predetermined area based on points where a plurality of vertical lines 811 and a plurality of horizontal lines 813 intersect. Additionally, the touch panel 810 may specify a point where each vertical line 811 and each horizontal line 813 intersects as a touch coordinate corresponding to each cell.

According to various embodiments of the present disclosure, when a touch operation is performed in a state of being stained with water or sweat, an area 850 where water or sweat spreads may coincide with an area 831 corresponding to contact of a finger 830. The electronic device 800 may recognize a touch coordinates 833 in the area 831 as a touch coordinates corresponding to a valid touch input. Additionally, the electronic device 800 may recognize a touch coordinates 851 in an area 850 as a touch coordinates corresponding to a valid touch input. However, the touch coordinates 851 may be unintentional, as would occur when a touch operation is performed when the screen or finger 830 is stained with water or sweat, causing an area 870 where water or sweat contacts the screen. In this case, the electronic device 800 may also recognize a touch coordinates 871 in the area 870 as a valid touch input.

As mentioned above, in order to prevent an unintentional touch coordinates from being recognized, the electronic device 800 may adjust a touch input processing method according to a state of a touch object. For example, the electronic device 800 may adjust the touch sensitivity of the touch panel 810 according to a state of a touch object. According to an embodiment of the present disclosure, when the state of the touch object is determined as a water film state, the electronic device 800 may adjust the touch sensitivity of the touch panel 810 to be lower than a standard value or threshold. For example, when the size of a capacitance change is greater than a specified size, the electronic device 800 may adjust the touch sensitivity to be processed as a valid touch input. Accordingly, the electronic device 800 may process a capacitance change corresponding to the contact of the finger 830 as a valid touch input, and invalidate (e.g., treat as noise) a capacitance change due to water or sweat. Additionally, the electronic device 800 may process the touch coordinates 833 as a touch coordinates corresponding to a valid touch input, and ignore the contact at touch coordinates 871.

Figure 9:
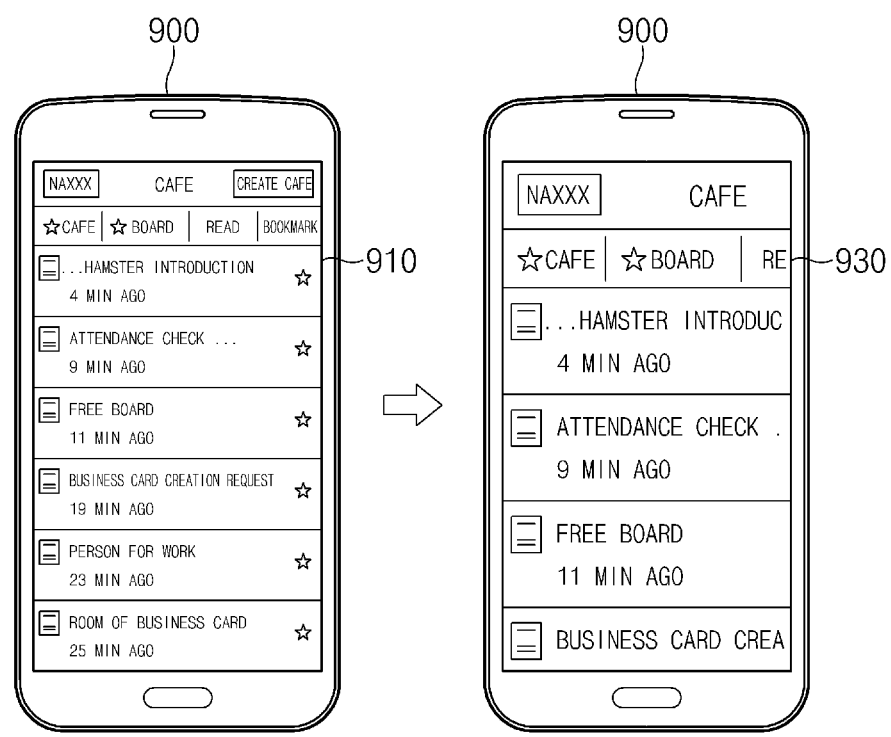
FIG. 9 is a view for adjusting an output state of a display object depending on a state of a touch object according to various embodiments of the present disclosure.

FIG. 9 is a view for adjusting an output state of a display object depending on a state of a touch object according to various embodiments of the present disclosure. The electronic device 900 may further perform a method of adjusting a touch area of a display object in addition to a method of adjusting a touch sensitivity according a state of a touch object. Additionally, the electronic device 900 may adjust the output state of the display object in order to correspond to the touch area of the display object.

Referring to FIG. 9, the electronic device 900 may change the screen 910 into the screen 930 according to a state of a touch object and display it. The electronic device 900 may determine a state of a touch object and when a state change is checked, adjust the touch area of the display object. Additionally, the electronic device 900 may change the output state of the display object in order to correspond to the touch area of the display object. For example, when the state of the touch object is a normal state, the electronic device 900 may display the screen 910. Additionally, when the state of the touch object changes into a water film state, the electronic device 900 may adjust the touch area of the display object displayed on the screen 910 largely by a predetermined ratio. In this case, the electronic device 900 may output the screen 930 where the size of the display object is adjusted largely by a predetermined ratio in order to correspond to the touch area of the display object. The electronic device 900 may recognize a touch input more accurately through the above-mentioned method.

Figure 10:
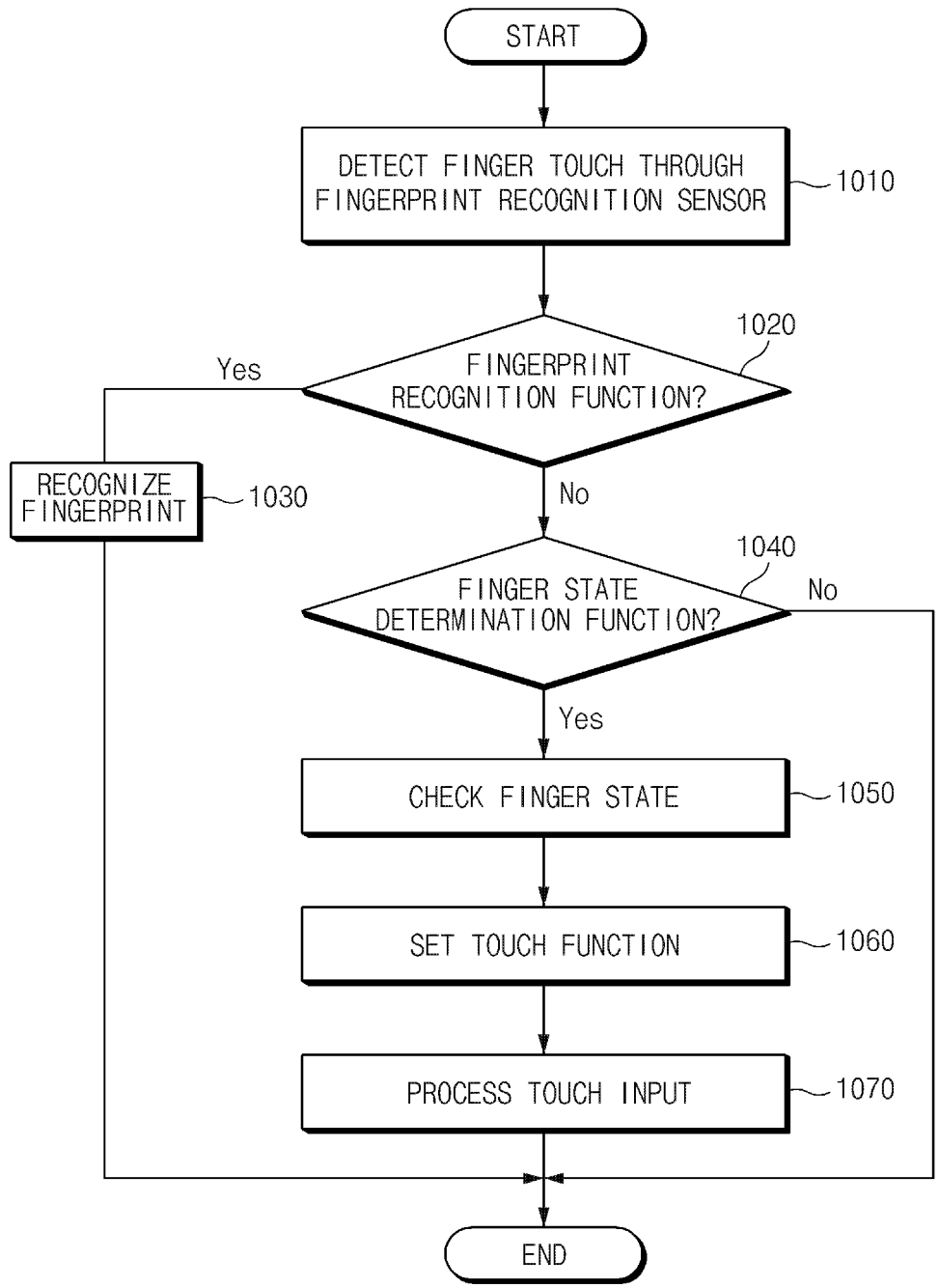
FIG. 10 is a flowchart illustrating an operating method of an electronic device relating to a method of processing a touch input based on a fingerprint recognition sensor according to various embodiments of the present disclosure.

FIG. 10 is a flowchart illustrating an operating method of an electronic device relating to a method of processing a touch input based on a fingerprint recognition sensor according to various embodiments of the present disclosure. According to various embodiments of the present disclosure, an electronic device (for example, the electronic device 200 of FIG. 2) may differently process a touch input (for example, a finger touch) detected through the fingerprint recognition sensor according to a specific function performance state of the electronic device. For example, the electronic device may differently process the touch input according to whether a fingerprint recognition function is in a performance state or whether a function for determining a state of a touch object (for example, a finger) is in a performance state.

Referring to FIG. 10, the electronic device may detect a finger touch based on the fingerprint recognition sensor in operation 1010. Additionally, the electronic device may determine whether a fingerprint recognition function is in a performance state in operation 1020. That is, the electronic device determines whether the fingerprint recognition function is activated. According to an embodiment of the present disclosure, the electronic device may perform a fingerprint recognition function at a time point that the power of the electronic device changes from a turn-off state into a turn-on state. Additionally, the electronic device may perform a fingerprint recognition function at a time point that the screen of the electronic device changes from a turn-off state into a turn-on state, when a specific application program included in the electronic device is executed, or when a specific application program provides a request.

When a fingerprint recognition function is in a performance state, in operation 1030, the electronic device may perform the fingerprint recognition function based on sensor information corresponding to a finger touch. For example, the electronic device may collect user fingerprint information (for example, the lengths, directions, or specific points of ridges included in a fingerprint) corresponding to the sensor information. Additionally, the electronic device may perform a function such as user authentication by using the fingerprint information.

When a fingerprint recognition function is not in a performance state, in operation 1040, the electronic device may determine whether a function for determining a finger state is in a performance state. According to an embodiment of the present disclosure, when the fingerprint recognition function is not in a performance state, the electronic device may skip operation 1040 and perform operation 1050 and subsequent operations. According to various embodiments of the present disclosure, even when the fingerprint recognition function is in a performance state, the electronic device may perform operation 1050 and subsequent operations in addition to operation 1030.

According to various embodiments of the present disclosure, the electronic device may perform a function for determining a finger state at a time point that an operation of a specific physical button (for example, a home button or a power button) satisfies a specified condition, at a time point a specific object (for example, icon or image) configured on a home screen or a menu screen is selected, or at a time point that a specific application program is executed or a specific application program provides a request. For example, when a specific physical button is selected within a specified time by a specified number of times (for example, by being pressed) or a specific physical button is selected at a time point that the electronic device completes the fingerprint recognition performance, the electronic device may perform a finger state determination function. Additionally, the electronic device may perform the finger state determination function at a time point that a specific object (for example, the touch object state icon 650 of FIG. 6) functioning to change a state of a touch input processing function is selected. The electronic device may perform a finger state determination function at a time point that a specific application program, for example, a healthcare application program, is executed.

According to various embodiments of the present disclosure, the electronic device may perform a fingerprint recognition function based on the fingerprint recognition sensor in operation 1030 and perform operation 1050 and subsequent operations by using information collected through the fingerprint recognition sensor at the same time or with a predetermined time interval. For example, when a specific fingerprint recognition event occurs during the fingerprint recognition function performance, the electronic device may process a touch input by delivering the specific fingerprint recognition event, a finger state event corresponding to the specific fingerprint recognition event, or information collected based on the fingerprint recognition sensor to at least one of a processor (for example, the processor 220 of FIG. 2) or a touch input device (for example, the touch input device 280 of FIG. 2). According to an embodiment of the present disclosure, the electronic device may store information collected based on the fingerprint recognition sensor in a memory (for example, the memory 230 of FIG. 2). In this case, the electronic device may determine a finger state based on the information stored in the memory at a specific time point.

In operation 1050, the electronic device may check finger state information corresponding to the sensor information. According to an embodiment of the present disclosure, the electronic device may determine a finger state by analyzing the sensor information. Alternatively, the electronic device may check a finger state through a fingerprint recognition event occurring during the fingerprint recognition function performance or a finger state event corresponding to the fingerprint recognition event.

In operation 1060, the electronic device may set a touch function according to a finger state. For example, when a finger state is a water film state, a pollution film state, or a grooves worn state, the electronic device may set the touch function as a water film function, a pollution film function, or a gloves function, respectively. According to various embodiments of the present disclosure, the electronic device may deliver the finger state event (or information corresponding thereto) to the touch input device. In this case, based on the finger state event (or information corresponding thereto), the touch input device may perform a control to set (for example, perform a touch sensitivity adjustment or ghost touch input removal function) the touch function in the touch input device. In operation 1070, the electronic device may process a touch input according to the set touch function.

FIG. 11 is a finger state event table according to various embodiments of the present disclosure. According to various embodiments of the present disclosure, the electronic device (for example, the electronic device 200 of FIG. 2) may check a state of a touch object (for example, a finger) through a touch object state event (for example, a finger state event). For example, the electronic device may include a program (for example, the touch input control program of FIG. 2) implemented to control touch input processing. The electronic device may check a state of a touch object through a touch object state event according to a processing routine implemented in the touch input control program. In this case, the touch input control program may include a touch object event table (for example, the finger state event table 1110) that specifies a state of a touch object corresponding to a touch object state event. According to an embodiment of the present disclosure, the electronic device may store the touch object state event table in a memory (for example, the memory 230 of FIG. 2).

Referring to FIG. 11, the finger state event table 1110 may include event information corresponding to a finger state. For example, the finger state event table 1110 may include identifier information of a specified event according to a finger state. Additionally, the finger state event table 1110 may include operating state information of a sensor (for example, the sensor 210 of FIG. 2). According to an embodiment of the present disclosure, the finger state event table 1110 may include sensor related hardware or software error information and interrupt information occurring during the collection of sensor information corresponding to a finger state through the sensor. For example, the finger state event table 1110 may include identifier information of an event corresponding to error information of the sensor or interrupt information occurring during the sensor information collection.

Figure 12:
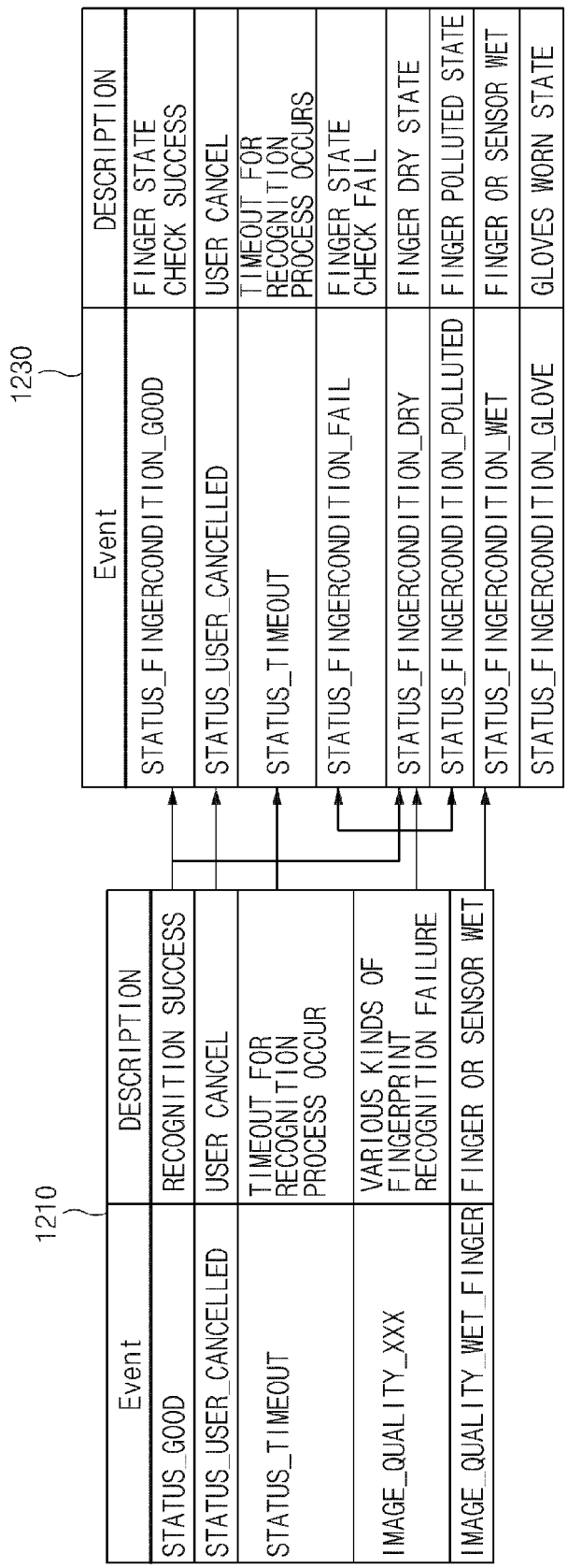
FIG. 12 is a view illustrating a finger state event corresponding to a fingerprint recognition event according to various embodiments of the present disclosure.

FIG. 12 is a view illustrating a finger state event corresponding to a fingerprint recognition event according to various embodiments of the present disclosure.

Referring to FIG. 12, the electronic device (for example, the electronic device 200 of FIG. 2) may match one of the fingerprint recognition events in table 1210 to one of the finger state events in table 1230 (or information corresponding thereto). According to an embodiment of the present disclosure, a fingerprint recognition sensor (for example, the sensor 210 of FIG. 2) may deliver a fingerprint recognition event as indicated in table 1210 occurring during the collection process of sensor information to the electronic device. For example, when fingerprint recognition is successful, the fingerprint recognition sensor may deliver, to a processor (for example, the processor 220 of FIG. 2) at least one of fingerprint recognition success events (for example, an event having an identifier specified as "STATUS_GOOD" among the fingerprint recognition events as seen in table 1210) corresponding to the sensor information or the fingerprint recognition success. According to various embodiments of the present disclosure, the electronic device may store the fingerprint recognition event listed in table 1210 in addition to event occurrence time information in a memory (for example, the memory 230 of FIG. 2).

According to various embodiments of the present disclosure, the electronic device may map the fingerprint recognition event from table 1210 to the finger state event from table 1230 (or information corresponding thereto) and manage it. For example, in correspondence to the occurrence of a fingerprint recognition success event (for example, an event having an identifier specified as "STATUS_GOOD" among the fingerprint recognition events in table 1210), the electronic device may map a corresponding event into at least one of a normal state finger state event (for example, an event having an identifier specified as "STATUS_FIN-GERCONDITION_GOOD" among the finger state events in table 1230 or information corresponding thereto) or a dry state finger state event (for example, an event having an identifier specified as "STATUS_FINGERCONDITION_DRY" among the finger state events in table 1230) and manage it. According to various embodiments of the present disclosure, the electronic device may deliver the finger state event (or information corresponding thereto) to a touch input device (for example, the touch input device 280 of FIG. 2) of a display (for example, the display 290 of FIG. 2). For example, in correspondence to the occurrence of a state event (for example, an event having an identifier specified as "IMAGE_QUALITY_WET_FINGER") that a finger or the finger recognition sensor is wet among the fingerprint recognition events in table 1210, the electronic device may map a corresponding event to a wet finger state event (for example, an event having an identifier specified as "STATUS_FINGERCONDITION_WET" among the finger state events in table 1230 or information corresponding thereto) and manage it. Additionally, the electronic device may process a touch input by delivering the wet finger state event (or information corresponding thereto) to at least one of the touch input device or the display.

According to various embodiments of the present disclosure, the electronic device may perform a control to process a touch input based on the fingerprint recognition event in table 1210 and event occurrence time information stored in the memory. For example, the electronic device may check the most recently stored fingerprint recognition event in table 1210 based on the event occurrence time information. When a storage time of the fingerprint recognition event in table 1210 does not exceed a specified time, the electronic device may perform a control to process a touch input by delivering the finger state event in table 1230 (or information corresponding thereto) corresponding to the fingerprint recognition event in table 1210 to at least one of the touch input device or the display. According to an embodiment of the present disclosure, when a storage time of the fingerprint recognition event in table 1210 exceeds a specified time, the electronic device may perform a control to output a display object or voice information for inducing a finger to approach or contact the fingerprint recognition sensor.

According to various embodiments of the present disclosure, the mapping and managing tasks of an event (for example, the fingerprint recognition event in table 1210) occurring during the sensor information collection of a sensor (for example, the sensor 210 of FIG. 2) and a touch object state event (for example, the finger state event in table 1230 or information corresponding thereto) may be performed according to a processing routine that is implemented in a touch input control program (for example, the touch input control program 231 of FIG. 2). As shown in the drawing, although it is shown that the electronic device maps the fingerprint recognition event of a fingerprint recognition sensor into the finger state events in table 1230 (or information corresponding thereto), the electronic device may map an event of various sensors into a touch object state event (for example, the finger state event in table 1230) and manage it.

Figure 13:
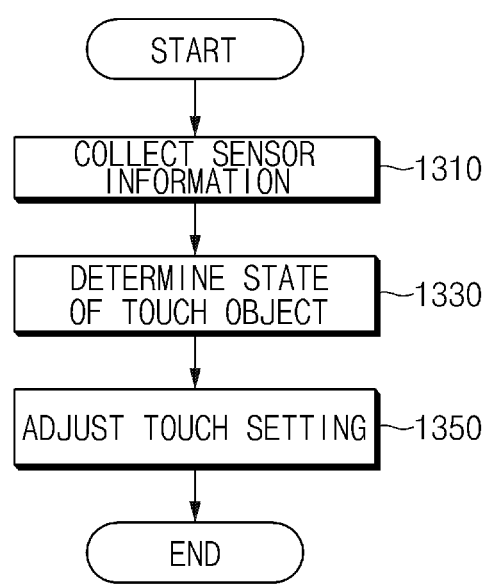
FIG. 13 is a flowchart illustrating an operating method of an electronic device relating to touch input processing according to various embodiments of the present disclosure.

FIG. 13 is a flowchart illustrating an operating method of an electronic device relating to touch input processing according to various embodiments of the present disclosure.

Referring to FIG. 13, in operation 1310, an electronic device (for example, the electronic device 200 of FIG. 2) may collect sensor information by sensing a touch object based on a sensor (for example, the sensor 210 of FIG. 2). For example, the sensor may collect sensor information corresponding to an approach or contact of the touch object.

According to various embodiments of the present disclosure, the sensor may deliver the collected sensor information to the electronic device. According to an embodiment of the present disclosure, the sensor may deliver an event (for example, the fingerprint recognition event 1210 of FIG. 12) occurring in relation to the collection of the sensor information to the electronic device. In this case, the electronic device may map the event into a touch object state event (for example, the finger state event 1230 of FIG. 12 or information corresponding thereto) and manage it.

In operation 1330, the electronic device may determine a state of the touch object based on the sensor information. For example, the processor 130 may determine a state of the touch object by analyzing the sensor information and comparing the analyzed information with normal state information of the touch object. According to an embodiment of the present disclosure, the electronic device may determine a state of the touch object based on the touch object state event (or information corresponding thereto).

In operation 1350, the electronic device may adjust a touch setting according to the determined state of the touch object. According to an embodiment of the present disclosure, the electronic device may adjust a touch sensitivity of a touch input device (for example, the touch input device 280 of FIG. 2) according to the state of the touch object. Additionally, the electronic device may adjust a touch area of display objects displayed on a display (for example, the display 290 of FIG. 2) according to the state of the touch object and accordingly, adjust an output state of the display object.

Figure 14:
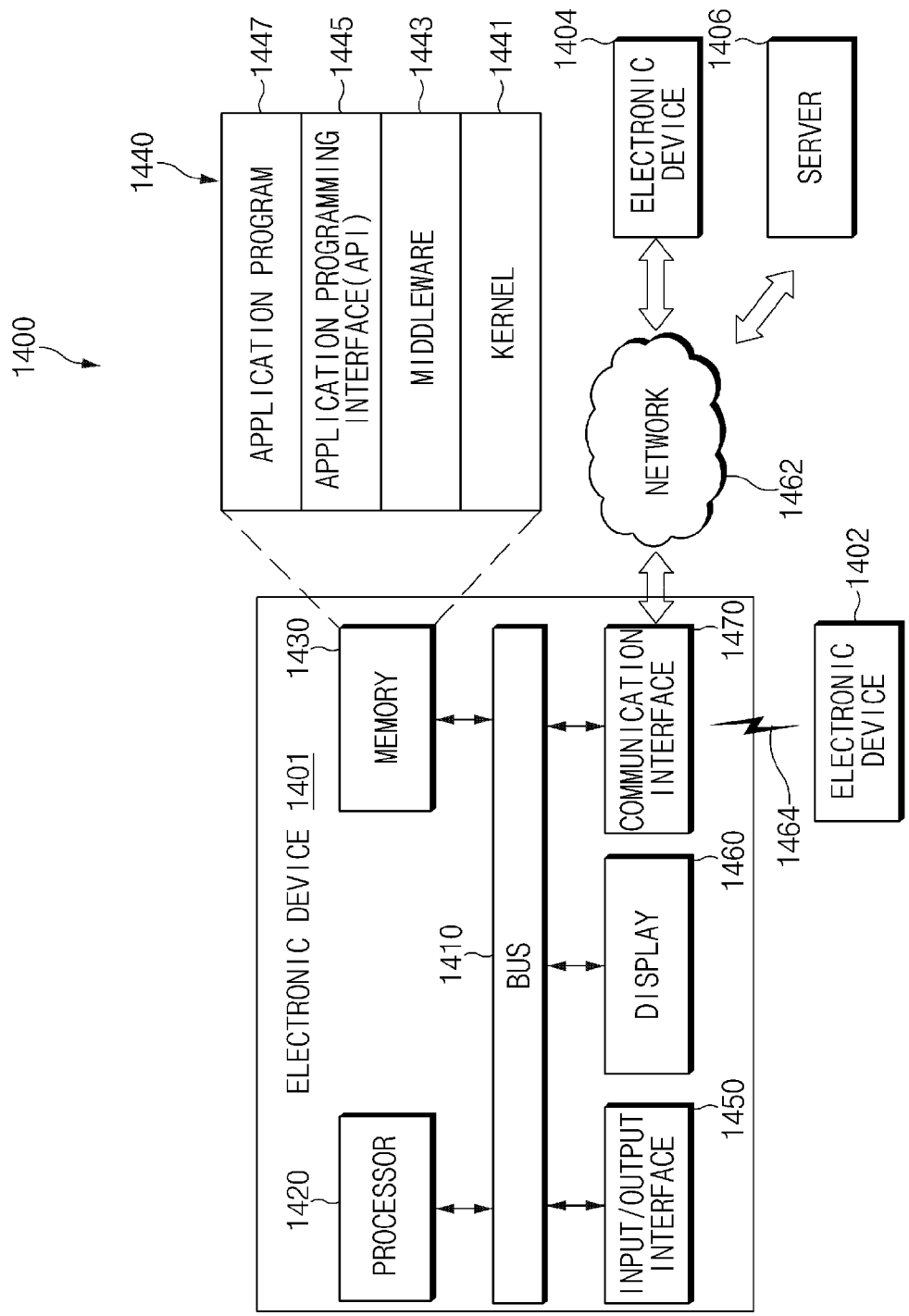
FIG. 14 is a view illustrating an electronic device in a network environment according to various embodiments of the present disclosure.

FIG. 14 is a view illustrating an electronic device 1401 in a network environment 1400 according to various embodiments of the present disclosure.

Referring to FIG. 14, the electronic device 1401 may include a bus 1410, a processor 1420, a memory 1430, an input/output interface 1450, a display 1460, and a communication interface 1470. According to an embodiment of the present disclosure, the electronic device 1401 may omit at least one of the components or may additionally include a different component.

The bus 1410, for example, may include a circuit for connecting the components 1410 to 1470 to each other and delivering a communication (for example, control message and/or data) between the components 1410 to 1470.

The processor 1420 may include at least one of a central processing unit (CPU), an Application Processor (AP), and a communication processor (CP). The processor 1420, for example, may execute calculation or data processing for control and/or communication of at least one another component of the electronic device 1401.

The memory 1430 may include volatile and/or nonvolatile memory. The memory 1430, for example, may store instructions or data relating to at least one another component of the electronic device 1401. According to an embodiment of the present disclosure, the memory 1430 may store software and/or program 1440. The program 1440 may include a kernel 1441, a middleware 1443, an application programming interface (API) 1445, and/or an application program (or an application) 1447. At least part of the kernel 1441, the middleware 1443, and the API 1445 may be called an operating system (OS).

The kernel 1441, for example, may control or manage system resources (for example, the bus 1410, the processor 1420, the memory 1430, and so on) used for performing operations or functions implemented in other programs (for example, the middleware 1443, the API 1445, or the application program 1447). Additionally, the kernel 1441 may provide an interface for controlling or managing system resources by accessing an individual component of the electronic device 1401 from the middleware 1443, the API 1445, or the application program 1447.

The middleware 1443, for example, may serve as an intermediary role for exchanging data as the API 1445 or the application program 1447 communicates with the kernel 1441.

Additionally, the middleware 1443 may process at least one job request received from the application program 1447 according to a priority. For example, the middleware 1443 may assign to at least one application program 1447 a priority for using a system resource (for example, the bus 14010, the processor 1420, or the memory 1430) of the electronic device 1401. For example, the middleware 1443 may perform scheduling or load balancing on the at least one job request by processing the at least one job request according to the priority assigned to the at least one job request.

The API 1445, as an interface for allowing the application program 1447 to control a function provided from the kernel 1441 or the middleware 1443, may include at least one interface or function (for example, an instruction) for file control, window control, image processing, or character control.

The input/output interface 1450, for example, may serve as an interface for delivering instructions or data inputted from a user or another external device to another component (s) of the electronic device 1401. Additionally, the input/output interface 1450 may output instructions or data received from another component(s) of the electronic device 1401 to a user or another external device.

The display 1460, for example, may include a liquid crystal display (LCD), a light emitting diode (LED) display, an organic light emitting diode (OLED) display, a microelectromechanical systems (MEMS) display, or an electronic paper display. The display 1460 may display various contents (for example, text, image, video, icon, symbol, and so on) to a user. The display 1460 may include a touch screen, and for example, may receive a touch, gesture, proximity, or hovering input by using an electronic pen or a user's body part.

The communication interface 1470, for example, may set a communication between the electronic device 1401 and an external device (for example, the first external electronic device 1402, the second external electronic device 1404, or the server 1406). For example, the communication interface 1470 may communicate with an external device (for example, the second external electronic device 1404 or the server 1406) in connection to the network 1462 through wireless communication or wired communication.

The wireless communication, as a cellular communication protocol, may use at least one of long-term evolution (LTE), LTE Advance (LTE-A), code division multiple access (CDMA), wideband CDMA (WCDMA), universal mobile telecommunications system (UMTS), Wireless Broadband (WiBro), Global System for Mobile Communications (GSM), and so on. Additionally, the wireless communication, for example, may include a short-range communication 1464. The short-range communication 1464, for example, may include at least one of wireless fidelity (WiFi), Bluetooth (BT), near field communication (NFC), global positioning system (GPS), and so on. The GNSS may include at least one of GPS, Glonass, and Beidou Navigation Satellite System (hereinafter referred to as Beidou) and Galileo, that is, the European global satellite-based navigation system. Hereinafter, GPS and GNSS may be interchangeably used. The wired communication, for example, may include at least one of universal serial bus (USB), high definition multimedia interface (HDMI), recommended standard 232 (RS-232), plain old telephone service (POTS), and so on. The network 1462 may include telecommunications network, for example, at least one of computer network (for example, LAN or WAN), internet, and telephone network.

Each of the first and second external electronic devices 1402 and 1404 may be the same or different type of the electronic device 1401. According to an embodiment of the present disclosure, the server 1406 may include a group of one or more servers. According to various embodiments of the present disclosure, all or part of operations executed on the electronic device 1401 may be executed on another one or more electronic devices (for example, the electronic device 1402 or 1404 or the server 1406). According to an embodiment of the present disclosure, when the electronic device 1401 performs a certain function or service automatically or by a request, it may request at least part of a function relating thereto from another device (for example, the electronic device 1402 or 1402 or the server 1406) instead of or in addition to executing the function or service by itself. The other electronic device (for example, the external electronic device 1402 or 1404 or the server 1406) may execute a requested function or an additional function and may deliver an execution result to the electronic device 1401. The electronic device 1401 may provide the requested function or service as it is or by processing the received result additionally. For this, for example, cloud computing, distributed computing, or client-server computing technology may be used.

Figure 15:
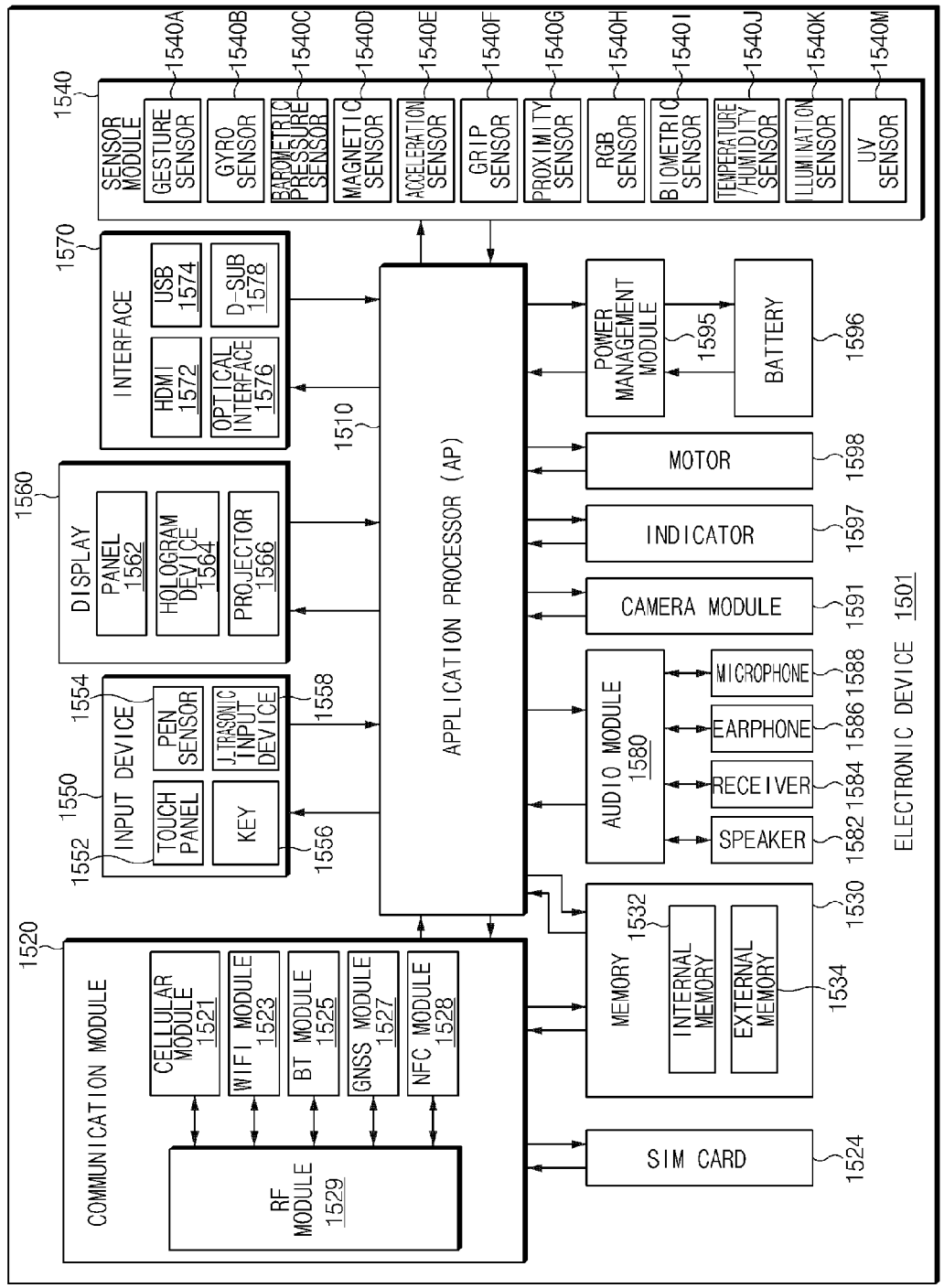
FIG. 15 is a block diagram illustrating an electronic device according to various embodiments of the present disclosure.

FIG. 15 is a block diagram of an electronic device 1501 according to various embodiments of the present disclosure. The electronic device 1501, for example, may include all or part of the electronic device 1401 shown in FIG. 14. The electronic device 1501 may include at least one processor (for example, an application processor or "AP") 1510, a communication module 1520, a subscriber identification module (SIM) 1524, a memory 1530, a sensor module 1540, an input device 1550, a display 1560, an interface 1570, an audio module 1580, a camera module 1591, a power management module 1595, a battery 1596, an indicator 1597, and a motor 1598.

The processor 1510 may control a plurality of hardware or software components connected thereto and also may perform various data processing and operations by executing an operating system or an application program. The processor 1510 may be implemented with a system on chip (SoC), for example. According to an embodiment of the present disclosure, the processor 1510 may further include a graphic processing unit (GPU) (not shown) and/or an image signal processor. The processor 1510 may include at least part (for example, the cellular module 1521) of components shown in FIG. 15. The processor 1510 may load commands or data received from at least one of other components (for example, nonvolatile memory) and process them and may store various data in a nonvolatile memory.

The communication module 1520 may have the same or similar configuration to the communication interface 1470 of FIG. 14. The communication module 1520 may include a cellular module 1521, a WiFi module 1523, a BT module 1525, a GNSS module 1527 (for example, a GPS module, a Glonass module, a Beidou module, or a Galileo module), an NFC module 1528, and a radio frequency (RF) module 1529.

The cellular module 1521, for example, may provide voice call, video call, text service, or internet service through communication network. According to an embodiment of the present disclosure, the cellular module 1521 may perform a distinction and authentication operation on the electronic device 1501 in a communication network by using a SIM (for example, a SIM card) 1524. According to an embodiment of the present disclosure, the cellular module 1521 may perform at least part of a function that the processor 1510 provides. According to an embodiment of the present disclosure, the cellular module 1521 may include a communication processor (CP).

Each of the WiFi module 1523, the BT module 1525, the GNSS module 1527, and the NFC module 1528 may include a processor for processing data transmitted/received through a corresponding module. According to an embodiment of the present disclosure, at least part (for example, at least one) of the cellular module 1521, the WiFi module 1523, the BT module 1525, the GNSS module 1527, and the NFC module 1528 may be included in one integrated chip (IC) or IC package.

The RF module 1529, for example, may transmit/receive communication signals (for example, RF signals). The RF module 1529, for example, may include a transceiver, a power amp module (PAM), a frequency filter, a low noise amplifier (LNA), or an antenna. According to another embodiment of the present disclosure, at least one of the cellular module 1521, the WiFi module 1523, the BT module 1525, the GNSS module 1527, and the NFC module 1528 may transmit/receive RF signals through a separate RF module.

The SIM 1524, for example, may include a card including a SIM and/or an embedded SIM and also may include unique identification information (for example, an integrated circuit card identifier (ICCID)) or subscriber information (for example, an international mobile subscriber identity (IMSI)).

The memory 1530 (for example, the memory 1430) may include an internal memory 1532 or an external memory 1534. The internal memory 1532 may include at least one of a volatile memory (for example, dynamic RAM (DRAM), static RAM (SRAM), synchronous dynamic RAM (SDRAM)) and a non-volatile memory (for example, one time programmable ROM (OTPROM), programmable ROM (PROM), erasable and programmable ROM (EPROM), electrically erasable and programmable ROM (EEPROM), mask ROM, flash ROM, flash memory (for example, NAND flash or NOR flash), hard drive, and solid state drive (SSD)).

The external memory 1534 may further include flash drive, for example, compact flash (CF), secure digital (SD), micro Micro-SD, Mini-SD, extreme digital (xD), multimedia card (MMC) or a memorystick. The external memory 1534 may be functionally and/or physically connected to the electronic device 1501 through various interfaces.

The sensor module 1540 measures physical quantities or detects an operating state of the electronic device 1501, thereby converting the measured or detected information into electrical signals. The sensor module 1540 may include at least one of a gesture sensor 1540A, a gyro sensor 1540B, a barometric pressure sensor 1540C, a magnetic sensor 1540D, an acceleration sensor 1540E, a grip sensor 1540F, a proximity sensor 1540G, a color sensor 1540H (for example, a red, green, blue or "RGB" sensor), a biometric sensor 1540I, a temperature/humidity sensor 1540J, an illumination sensor 1540K, and an ultra violet (UV) sensor 1540M. Additionally or alternatively, the sensor module 1540 may include an E-nose sensor, an electromyography (EMG) sensor, an electroencephalogram (EEG) sensor, an electrocardiogram (ECG) sensor, an infra-red (IR) sensor, an iris sensor, and/or a fingerprint sensor. The sensor module 1540 may further include a control circuit for controlling at least one sensor therein. According to an embodiment of the present disclosure, the electronic device 1501 may further include a processor configured to control the sensor module 1540 as part of or separately from the processor 1510 and thus may control the sensor module 1540 while the processor 1510 is in a sleep state.

The input device 1550 may include a touch panel 1552, a (digital) pen sensor 1554, a key 1556, or an ultrasonic input device 1558. The touch panel 1552 may use at least one of capacitive, resistive, infrared, or ultrasonic methods, for example. Additionally, the touch panel 1552 may further include a control circuit. The touch panel 1552 may further include a tactile layer to provide tactile response to a user.

The (digital) pen sensor 1554, for example, may include a sheet for recognition as part of a touch panel or a separate sheet for recognition. The key 1556 may include a physical button, an optical key, or a keypad, for example. The ultrasonic input device 1558 may detect ultrasonic waves generated from an input tool through a microphone (for example, the microphone 1588) in order to check data corresponding to the detected ultrasonic waves.

The display 1560 (for example, the display 1460) may include a panel 1562, a hologram device 1564, or a projector 1566. The panel 1562 may have the same or similar configuration to the display 1460 of FIG. 14. The panel 1562 may be implemented to be flexible, transparent, or wearable, for example. The panel 1562 and the touch panel 1552 may be configured with one module. The hologram device 1564 may show three-dimensional images in the air by using the interference of light. The projector 1566 may display an image by projecting light on a screen. The screen, for example, may be placed inside or outside the electronic device 1501. According to an embodiment of the present disclosure, the display 1560 may further include a control circuit for controlling the panel 1562, the hologram device 1564, or the projector 1566.

The interface 1570 may include a high-definition multimedia interface (HDMI) 1572, a universal serial bus (USB) 1574, an optical interface 1576, or a D-subminiature (sub) 1578 for example. The interface 1570, for example, may be included in the communication interface 1470 shown in FIG. 14. Additionally or alternatively, the interface 1570 may include a mobile high-definition link (MHL) interface, a secure Digital (SD) card/multi-media card (MMC) interface, or an infrared data association (IrDA) standard interface.

The audio module 1580 may convert sound into electrical signals and convert electrical signals into sounds. At least some components of the audio module 1580, for example, may be included in the input/output interface 1450 shown in FIG. 14. The audio module 1580 may process sound information inputted/outputted through a speaker 1582, a receiver 1584, an earphone 1586, or a microphone 1588.

The camera module 1591, as a device for capturing a still image and a video, may include at least one image sensor (for example, a front sensor or a rear sensor), a lens, an image signal processor (ISP), or a flash (for example, an LED or a xenon lamp).

The power management module 1595 may manage the power of the electronic device 1501. According to an embodiment of the present disclosure, the power management module 1595 may include a power management IC (PMIC), a charger IC, or a battery or fuel gauge, for example. The PMIC may have a wired and/or wireless charging method. As the wireless charging method, for example, there is a magnetic resonance method, a magnetic induction method, or an electromagnetic method. An additional circuit for wireless charging, for example, a circuit such as a coil loop, a resonant circuit, or a rectifier circuit, may be added. The battery gauge may measure the remaining amount of the battery 1596, or a voltage, current, or temperature thereof during charging. The battery 1596, for example, may include a rechargeable battery and/or a solar battery.

The indicator 1597 may display a specific state of the electronic device 1501 or part thereof (for example, the processor 1510), for example, a booting state, a message state, or a charging state. The motor 1598 may convert electrical signals into mechanical vibration and may generate vibration or haptic effect. Although not shown in the drawings, the electronic device 1501 may include a processing device (for example, a GPU) for mobile TV support. A processing device for mobile TV support may process media data according to the standards such as digital multimedia broadcasting (DMB), digital video broadcasting (DVB), or mediaFLO™.

Each of the above-mentioned components of the electronic device according to various embodiments of the present disclosure may be configured with at least one component and the name of a corresponding component may vary according to the kind of an electronic device. According to various embodiments of the present disclosure, an electronic device according to various embodiments of the present disclosure may include at least one of the above-mentioned components, may not include some of the above-mentioned components, or may further include another component. Additionally, some of components in an electronic device according to various embodiments of the present disclosure are configured as one entity, so that functions of previous corresponding components are performed identically.

Figure 16:
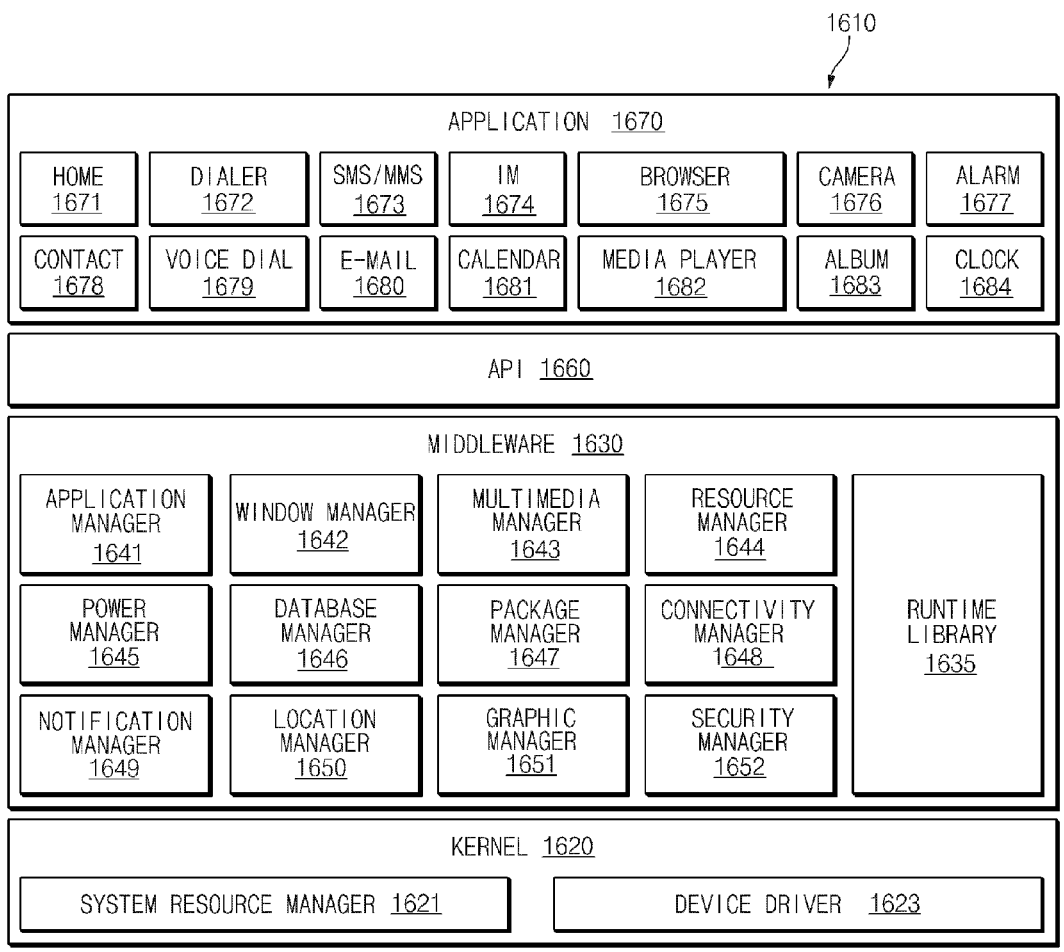
FIG. 16 is a block diagram illustrating a program module according to various embodiments of the present disclosure.

FIG. 16 is a block diagram illustrating a program module according to various embodiments of the present disclosure. According to an embodiment, the program module 1610 (for example, the program 1440) may include an operating system (OS) for controlling a resource relating to an electronic device (for example, the electronic device 1401) and/or various applications (for example, the application program 1447) running on the OS. The OS, for example, may include android, iOS, windows, Symbian, tizen, or bada.

The program module 1610 may include a kernel 1620, a middleware 1630, an application programming interface (API) 1660, and/or an application program (or an application) 1670. At least part of the program module 1610 may be preloaded on an electronic device or may be downloaded from a server (for example, the electronic devices 1402 and 1404 and the server 1406).

The kernel 1620 (for example, the kernel 1441), for example, may include a system resource manager 1621, or a device driver 1623. The system resource manager 1621 may perform the control, allocation, or retrieval of a system resource. According to an embodiment of the disclosure, the system resource manager 1621 may include a process management unit, a memory management unit, or a file system management unit. The device driver 1623, for example, a display driver, a camera driver, a Bluetooth driver, a sharing memory driver, a USB driver, a keypad driver, a WiFi driver, an audio driver, or an inter-process communication (IPC) driver.

The middleware 1630, for example, may provide a function that the application 1670 utilizes commonly, or may provide various functions to the application 1670 through the API 1660 in order to allow the application 1670 to efficiently use a limited system resource inside the electronic device. According to an embodiment of the disclosure, the middleware 1630 (for example, the middleware 1443) may include at least one of a runtime library 1635, an application manager 1641, a window manager 1642, a multimedia manager 1643, a resource manager 1644, a power manager 1645, a database manager 1646, a package manager 1647, a connectivity manager 1648, a notification manager 1649, a location manager 1650, a graphic manager 1651, and a security manager 1652.

The runtime library 1635, for example, may include a library module that a complier uses to add a new function through a programming language while the application 1670 is running. The runtime library 1635 may perform a function on input/output management, memory management, or an arithmetic function.

The application manager 1641, for example, may mange the life cycle of at least one application among the applications 1670. The window manager 1642 may manage a GUI resource used in a screen. The multimedia manager 1643 may recognize a format for playing various media files and may encode or decode a media file by using the codec corresponding to a corresponding format. The resource manager 1644 may manage a resource such as a source code, a memory, or a storage space of at least any one of the applications 1670.

The power manager 1645, for example, may operate together with a basic input/output system (BIOS) to manage the battery or power and may provide power information utilized for an operation of the electronic device. The database manager 1646 may create, search, or modify a database used in at least one application among the applications 1670. The package manager 1647 may manage the installation or update of an application distributed in a package file format.

The connectivity manager 1648 may manage a wireless connection such as WiFi or Bluetooth. The notification manager 1649 may display or notify an event such as arrival messages, appointments, and proximity alerts to a user in a manner of not interrupting the user. The location manager 1650 may manage location information on an electronic device. The graphic manager 1651 may manage a graphic effect to be provided to a user or a user interface relating thereto. The security manager 1652 may provide various security functions utilized for system security or user authentication. According to an embodiment, when an electronic device (for example, the electronic device 1401) includes a phone function, the middleware 1630 may further include a telephony manager for managing a voice or video call function of the electronic device.

The middleware 1630 may include a middleware module for forming a combination of various functions of the above-mentioned components. The middleware 1630 may provide a module specialized for each type of OS to provide differentiated functions. Additionally, the middleware 1630 may delete part of existing components or add new components dynamically.

The API 1660 (for example, the API 1445), for example, as a set of API programming functions, may be provided as another configuration according to OS. For example, in the case of android or iOS, one API set may be provided for each platform and in the case Tizen, at least two API sets may be provided for each platform.

The application 1670 (for example, the application program 1447) may include at least one application for providing functions such as a home 1671, a dialer 1672, an SMS/MMS 1673, an instant message 1674, a browser 1675, a camera 1676, an alarm 1677, a contact 1678, a voice dial 1679, an e-mail 1680, a calendar 1681, a media player 1682, an album 1683, a clock 1684, health care (for example, measure an exercise amount or blood sugar), or environmental information provision (for example, provide air pressure, humidity, or temperature information).

According to an embodiment, the application 1670 may include an application (hereinafter referred to as "information exchange application" for convenience of description) for supporting information exchange between the electronic device (for example, the electronic device 1401) and an external electronic device (for example, the electronic devices 1402 and 1404). The information exchange application, for example, may include a notification relay application for relaying specific information to the external device or a device management application for managing the external electronic device.

For example, the notification relay application may have a function for relaying to an external electronic device (for example, electronic devices 1402 and 1404) notification information occurring from another application (for example, an SMS/MMS application, an e-mail application, a health care application, or an environmental information application) of the electronic device. Additionally, the notification relay application may receive notification information from an external electronic device and may then provide the received notification information to a user.

The device management application, for example, may manage (for example, install, delete, or update) at least one function (turn-on/turn off of the external electronic device itself (or some components) or the brightness (or resolution) adjustment of a display) of an external electronic device (for example, the electronic devices 1402 and 1404) communicating with the electronic device, an application operating in the external electronic device, or a service (for example, call service or message service) provided from the external device.

According to an embodiment of the disclosure, the application 1670 may include a specified application (for example, a health care application of a mobile medical device) according to the property of an external electronic device (for example, the electronic devices 1402 and 1404). According to an embodiment, the application 1670 may include an application received from an external electronic device (for example, the server 1406 or the electronic device 1402 or 1404). According to an embodiment of the disclosure, the application 1670 may include a preloaded application or a third party application downloadable from a server. The names of components in the program module 1610 according to the shown embodiment may vary depending on the type of OS.

According to various embodiments of the present disclosure, at least part of the program module 1610 may be implemented with software, firmware, hardware, or a combination thereof. At least part of the programming module 1610, for example, may be implemented (for example, executed) by a processor (for example, the processor 1510).

At least part of the programming module 1610 may include a module, a program, a routine, sets of instructions, or a process to perform at least one function, for example.

According to various embodiments of the present disclosure, a malfunction of a touch input device may be prevented by processing a touch input according to a state of a touch object.

The term "module" used in various embodiments of the present disclosure, for example, may mean a unit including a combination of at least one of hardware, software, and firmware. The term "module" and the term "unit", "logic", "logical block", "component", or "circuit" may be interchangeably used. A "module" may be a minimum unit or part of an integrally configured component. A "module" may be a minimum unit performing at least one function or part thereof. A "module" may be implemented mechanically or electronically. For example, "module" according to various embodiments of the present disclosure may include at least one of an application-specific integrated circuit (ASIC) chip performing certain operations, field-programmable gate arrays (FPGAs), or a programmable-logic device, all of which are known or to be developed in the future.

According to various embodiments of the present disclosure, at least part of a device (for example, modules or functions thereof) or a method (for example, operations) according to this disclosure, for example, as in a form of a programming module, may be implemented using an instruction stored in computer-readable storage media. When at least one processor (for example, the processor 1420) executes an instruction, it may perform a function corresponding to the instruction. The non-transitory computer-readable storage media may include the memory 1430, for example.

The non-transitory computer-readable storage media may include hard disks, floppy disks, magnetic media (for example, magnetic tape), optical media (for example, compact disc read only memory (CD-ROM), and digital versatile disc (DVD)), magneto-optical media (for example, floptical disk), and hardware devices (for example, read only memory (ROM), random access memory (RAM), or flash memory). Additionally, a program instruction may include high-level language code executable by a computer using an interpreter in addition to machine code created by a complier. The hardware device may be configured to operate as at least one software module to perform an operation of various embodiments of the present disclosure and vice versa.

A module or a programming module according to various embodiments of the present disclosure may include at least one of the above-mentioned components, may not include some of the above-mentioned components, or may further include another component. Operations performed by a module, a programming module, or other components according to various embodiments of the present disclosure may be executed through a sequential, parallel, repetitive or heuristic method. Additionally, some operations may be executed in a different order or may be omitted. Or, other operations may be added. Moreover, the embodiments disclosed in this specification are suggested for the description and understanding of technical content but do not limit the range of the present disclosure. Accordingly, the range of the present disclosure should be interpreted as including all modifications or various other embodiments based on the technical idea of the present disclosure.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for". In addition, an artisan understands and appreciates that a "processor" or "microprocessor" may be hardware in the claimed disclosure. Under the broadest reasonable interpretation, the appended claims are statutory subject matter in compliance with 35 U.S.C. §101.

What is claimed is:

1. An electronic device comprising:
   a touch screen;
   a first touch sensor disposed on the electronic device separately from the touch screen; and
   a processor configured to:
      detect contact between the first touch sensor and a touch object generating sensor information,
      determine a state of the touch object based on analysis of the generated sensor information, and
      adjust a touch sensitivity for the touch screen according to the determined state of the touch object from the contact to the first touch sensor.

2. The electronic device of claim 1, wherein the first touch sensor comprises at least one of a fingerprint recognition sensor, a tactile sensor, a pH concentration sensor, and a touch sensor.

3. The electronic device of claim 1, wherein the processor is further configured to control the touch screen to display a visual guide for indicating an area outside an edge of the touch screen corresponding to the first touch sensor disposed separately from the touch screen, and
   wherein determining the state of the touch object further comprises:
      comparing the generated sensor information to normal state information for the touch object to detect whether a foreign material is present between the touch object and the first touch sensor,
   wherein pattern information of the foreign material includes at least one of pH concentration corresponding to the foreign material, surface state information corresponding to the foreign material, electrical conductivity information of the foreign material, and frequency spectrum information of the foreign material, and
   wherein the pattern information is detected via the first touch sensor and included in the generated sensor information.

4. The electronic device of claim 1, further comprising a display, wherein the processor is further configured to adjust a touch area of display objects outputted to the display according to the determined state of the touch object.

5. The electronic device of claim 4, wherein the processor is further configured to change at least one of a size and position of the display objects to correspond to the touch area.

6. The electronic device of claim 1, further comprising a display, wherein the processor is further configured to:
   control the display to display a touch function selection object including at least one item corresponding to a configurable state of the touch object,
   in response to detecting selection of at last one item from the touch function selection object, set a touch sensitivity of the touch screen according to the configurable state of the touch object corresponding to the selected item.

7. The electronic device of claim 6, wherein the processor controls the display to display the touch function selection object in response to detecting at least one of:
   activation of the display from a deactivated state,
   activation of touch input processing function from a deactivated state,
   selection of a specific physical button of the electronic device,
   execution of a specific application program of the electronic device is executed,
   detection of a request generated by the specific application program,
   detection of an input to a predetermined area of the display generated by the touch object,
   detecting of movement of the touch object in one of a predetermined direction and a predetermined distance within a predetermined time, and
   detection of one of movement and rotation of the electronic device at a predetermined interval in a predetermined direction for a predetermined number of times.

8. The electronic device of claim 1, wherein the processor is further configured to:
   in response to detecting lapse of a pre-specified time period, update the determined state of the touch object by detecting additional sensor information via the first touch sensor and adjust the touch sensitivity according to the updated determined state,
   wherein the pre-specified time period indicates a time interval for re-determining the state of the touch object.

9. The electronic device of claim 1, further comprising a display wherein the processor is further configured to control the display to display an icon indicating the determined state of the touch object in a predetermined area of the display,
   wherein at least one of a form, color, and size of the icon changes corresponding to a change in the determined state of the touch object.

10. The electronic device of claim 1, wherein in response to detecting a change to the determined state of the touch object, the processor is further configured to execute at least one of:

controlling a display of the electronic device to display an object including at least one of a text, an image, or an icon indicating the change to the determined state of the touch object, and controlling a voice output device of the electronic device to audibly produce voice information indicating the change to the determined state of the touch object.

11. A method in an electronic device, comprising:

detecting contact between a first touch sensor of the electronic device and a touch object the first touch sensor disposed separately from a touch screen of the electronic device, generating sensor information by the first touch sensor from the contact of the touch object;

determining, via a processor of the electronic device, a state of the touch object based on analysis of the generated sensor information; and adjusting a touch sensitivity of the touch screen according to the determined state of the object.

12. The method of claim 11, wherein the sensor information is detected in response to an approach or contact of the touch object to the first touch sensor which comprises at least one of a fingerprint recognition sensor, a tactile sensor, a pH concentration sensor, and a touch sensor.

13. The method of claim 11, further comprising controlling the touch screen to display a visual guide indicating an area outside an edge of the touch screen corresponding to the first touch sensor disposed separately from the touch screen; and wherein determining the state of the touch object further comprises:

comparing the generated sensor information to normal state information for the touch object to detect whether a foreign material is present between the touch object and the first touch sensor;

wherein pattern information of the foreign material includes at least one of pH concentration corresponding to the foreign material, surface state information corresponding to the foreign material, electrical conductivity information of the foreign material, and frequency spectrum information of the foreign material; and wherein the pattern information is detected via the first touch sensor and included in the generated sensor information.

14. The method of claim 11, wherein determining the state of the touch object further comprises:

displaying a touch function selection object including at least one item corresponding to a configurable state of the touch object; and in response to detecting selection of the at least one item from the touch function selection object, setting the touch sensitivity of the touch screen according to the configurable state of the touch object corresponding to the selected at least one item.

15. The method of claim 14, wherein the touch function selection object is displayed in response to at least one of:

activation of the display from a deactivated state, activation of touch input processing function from a deactivated state, selection of a specific physical button of the electronic device, execution of a specific application program of the electronic device is executed, detection of a request generated by the specific application program, detection of an input to a predetermined area of the display generated by the touch object, detecting of movement of the touch object in one of a predetermined direction and a predetermined distance within a predetermined time, and detection of one of movement and rotation of the electronic device at a predetermined interval in a predetermined direction for a predetermined number of times.

16. The method of claim 11, further comprising adjusting a touch area of display objects as displayed on a display according to the determined state of the touch object.

17. The method of claim 16, wherein adjusting the touch area further comprises: changing at least one of a size and a position of the display objects to correspond to the touch area.

18. The method of claim 11, further comprising:

in response to detecting lapse of a pre-specified time period, updating the determined state of the touch object by detecting additional sensor information via the first touch sensor and adjust the touch sensitivity according to the updated determined state, wherein the pre-specified time period indicates a time interval for re-determining the state of the touch object.

19. The method of claim 11, further comprising:

displaying an icon indicating the determined state of the touch object in a predetermined area of a display of the electronic device; and changing at least one of a form, a color, and a size of the icon according to the determined state of the touch object.

20. The method of claim 11, further comprising:

in response to detecting a change to the determined state of the touch object, executing at least one of:

displaying on a display an object including at least one of a text, an image, or an icon indicating the change to the determined state of the touch object, and audibly producing voice information via a voice output device indicating the change to the determined state of the touch object.

* * * * *